(12) United States Patent
Beaver et al.

(10) Patent No.: US 11,799,924 B2
(45) Date of Patent: Oct. 24, 2023

(54) GENERATING CUSTOMIZED PRODUCTS IN COLLABORATION WITH LIVE DESIGNERS AND AGENTS

(71) Applicant: ZAZZLE INC., Redwood City, CA (US)

(72) Inventors: Robert I. Beaver, San Francisco, CA (US); Jeffrey J. Beaver, San Francisco, CA (US); Sean Narvasa, Oakland, CA (US); Leslie Young Harvill, Olympia, WA (US); Petar S. Ivanov, Redwood City, CA (US); Parker H. Bossier, New York, NY (US); Christopher Collette, Los Altos, CA (US)

(73) Assignee: ZAZZLE INC., Menlo Park, CA (US)

( * ) Notice: Subject to any disclaimer, the term of this patent is extended or adjusted under 35 U.S.C. 154(b) by 80 days.

(21) Appl. No.: 17/240,074

(22) Filed: Apr. 26, 2021

(65) Prior Publication Data

US 2021/0266352 A1    Aug. 26, 2021

(51) Int. Cl.
*H04L 65/401* (2022.01)
*H04L 65/403* (2022.01)
(Continued)

(52) U.S. Cl.
CPC ........ *H04L 65/4015* (2013.01); *G06F 40/166* (2020.01); *H04L 63/101* (2013.01);
(Continued)

(58) Field of Classification Search
CPC ............... H04L 67/306; H04L 65/4015; H04L 65/4023; H04L 65/403; H04L 63/101; H04L 63/102; G06F 40/166
See application file for complete search history.

(56) References Cited

U.S. PATENT DOCUMENTS

| 10,637,899 B1 * | 4/2020 | Wilson ................. G06F 3/04842 |
| 2005/0182776 A1 * | 8/2005 | Yennie ................. G06F 16/2264 |

(Continued)

FOREIGN PATENT DOCUMENTS

| JP | 2019047453 A * | 3/2019 | ............... H04N 1/00 |
| WO | WO 2013/033643 A1 | 3/2013 | |
| WO | WO-2013180990 A2 * | 12/2013 | ........... G06F 30/392 |

OTHER PUBLICATIONS

The International Searching Authority, "Search Report" in application No. PCT/US2020/053585, dated Dec. 15, 2020, 13 pages.

(Continued)

*Primary Examiner* — Thu V Nguyen
*Assistant Examiner* — Angela M Widhalm De Rodriguez
(74) *Attorney, Agent, or Firm* — Patterson & Sheridan LLP; Malgorzata A. Kulczycka

(57) ABSTRACT

In some embodiments, a method for generating customized products in collaboration with live designers is disclosed. The method comprises: receiving, at a computer collaboration computer, a request, from a first user interface that executes on a first user device associated with a first user, for assistance in collaborating on an interactive design; wherein the request comprises collaboration parameters; in response to receiving the request, automatically determining one or more designer profiles, each designer profile satisfying one or more of the collaboration parameters; in response to selecting a particular designer profile from the one or more designer profiles: automatically enabling a collaboration on the interactive design between the first user and a second user who has the particular designer profile; wherein the collaboration between the first user and the second user comprises automatically generating and updating product description data having a plurality of key-values pairs associated with the interactive design.

20 Claims, 11 Drawing Sheets

(51) Int. Cl.
  *G06F 40/166* (2020.01)
  *H04L 9/40* (2022.01)
  *H04L 67/306* (2022.01)
  *H04L 65/402* (2022.01)

(52) U.S. Cl.
  CPC .......... *H04L 63/102* (2013.01); *H04L 65/403* (2013.01); *H04L 65/4025* (2022.05); *H04L 67/306* (2013.01)

(56) References Cited

U.S. PATENT DOCUMENTS

| | | | | |
|---|---|---|---|---|
| 2009/0259961 | A1* | 10/2009 | Bakli | G05B 19/0426 700/96 |
| 2009/0320035 | A1* | 12/2009 | Ahlgren | G06F 9/468 718/104 |
| 2010/0185547 | A1* | 7/2010 | Scholar | G06Q 50/188 705/80 |
| 2011/0016086 | A1* | 1/2011 | Bakir | G06F 16/252 707/610 |
| 2011/0153052 | A1* | 6/2011 | Pettibone | G05B 19/4097 700/98 |
| 2012/0316821 | A1* | 12/2012 | Levermore | G06Q 10/06 702/127 |
| 2013/0173714 | A1* | 7/2013 | D'Amore | H04L 67/22 709/205 |
| 2016/0246899 | A1* | 8/2016 | Hirschtick | G06F 30/17 |
| 2017/0126785 | A1* | 5/2017 | Esposito, II | H04L 65/403 |
| 2017/0308067 | A1* | 10/2017 | Lamparter | G05B 19/4183 |
| 2018/0158023 | A1* | 6/2018 | Soni | G06F 21/60 |
| 2018/0183892 | A1* | 6/2018 | Al Sabawi | H04L 67/1097 |
| 2018/0375942 | A1* | 12/2018 | Liu | H04L 67/125 |
| 2021/0118031 | A1 | 4/2021 | Beaver, III | |
| 2021/0263500 | A1* | 8/2021 | Jacobs | B33Y 50/00 |
| 2021/0312099 | A1* | 10/2021 | Apte | G06T 19/20 |

OTHER PUBLICATIONS

Current Claims in application No. PCT/US2020/053585, dated Dec. 2020, 5 pages.

The International Searching Authority, "Search Report" in Application No. PCT/US2022/020240, dated Jun. 22, 2022, 13 pages.

* cited by examiner

GENERATING CUSTOMIZED PRODUCTS IN COLLABORATION WITH LIVE DESIGNERS AND AGENTS

CROSS REFERENCE TO RELATED APPLICATIONS

This application is related to U.S. patent application Ser. No. 17/193,512, filed Mar. 5, 2021; U.S. application Ser. No. 17/038,659, filed Sep. 30, 2020; U.S. Pat. No. 8,090,461, granted Jan. 3, 2012; U.S. Pat. No. 8,175,931, granted May 8, 2012; U.S. Pat. No. 8,856,160, granted Oct. 7, 2014; U.S. Pat. No. 9,355,421, granted on May 31, 2016; U.S. Pat. No. 9,400,997, granted Jul. 26, 2016; U.S. Pat. No. 10,176,617, granted Jan. 8, 2019; and US published patent application no. 2013/0060654, filed Aug. 29, 2012; the entire contents of each of which are hereby incorporated by reference for all purposes as if fully set forth herein.

FIELD OF THE DISCLOSURE

One technical field of the disclosure is generating customized products in collaboration with live designers and agents via interactions with collaborative computer platforms. Another technical field is managing roles and interactions between designers and users of the collaborative computer platforms.

BACKGROUND

Popularity and scalability of computer-based collaboration applications these days are largely stimulated by many recent advances in computer technologies. Early examples of the collaboration applications include tools that offer collaborative text editing, text messaging, and multi-user task scheduling. Other collaboration applications offer shared spreadsheets, video conferencing, and video-sharing applications.

The recent innovations in information technologies have inspired the development of multi-user collaboration tools. Due to recent technological advances, many tools have been developed to facilitate, for example, an online-product-customization and interactivity capabilities to users. Collaborative customization of a product may include allowing multiple users to collaborate on a digital design, exchange ideas related to the design, and provide support and assistance in customizing the appearance of the product.

However, as the collaboration applications grow and include vendors and third-party service providers, it becomes more and more difficult to ensure that the collaboration sessions meet the requirements set forth in, for example, collaboration agreements between the users.

Therefore, there is a need to provide mechanisms for managing communications channels established between users of role-based collaborative systems, especially for managing collaborations during the process of generating customized products using the role-based collaborative systems.

SUMMARY

The appended claims may serve as a summary of the disclosure.

DETAILED DESCRIPTION

Figure 1:
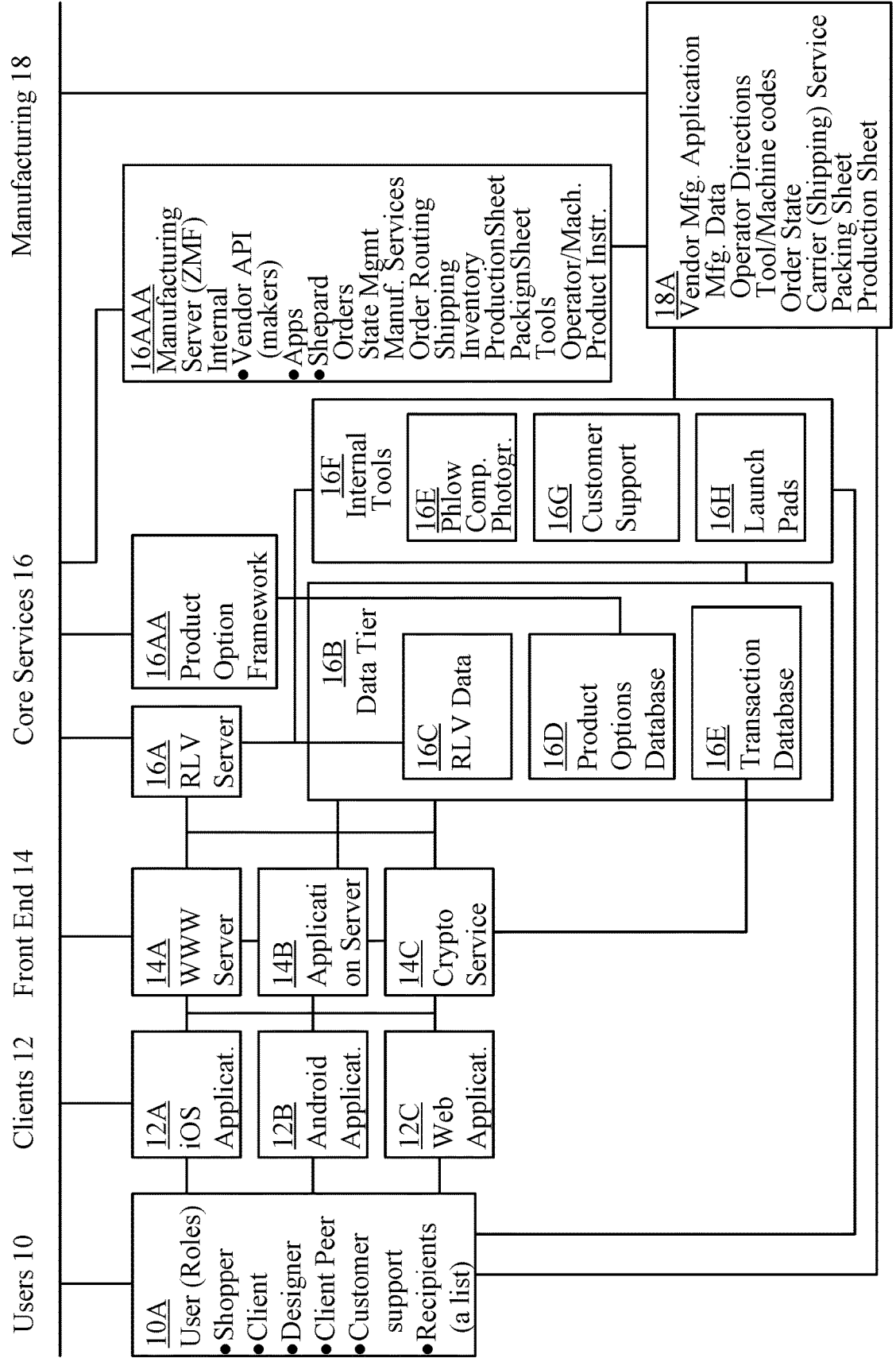
FIG. 1 is a block diagram showing an example environment for designing and manufacturing customized products.

In the following description, for the purposes of explanation, numerous specific details are set forth in order to provide a thorough understanding of the method described herein. It will be apparent, however, that the present approach may be practiced without these specific details. In some instances, well-known structures and devices are shown in a block diagram form to avoid unnecessarily obscuring the present approach. Embodiments are disclosed in sections according to the following outline:

1. GENERAL OVERVIEW
2. EXAMPLE COMPUTER ENVIRONMENTS
   2.1. USER DEVICES
   2.2. CLIENT APPLICATIONS
   2.3. FRONT END SERVERS
   2.4. CORE SERVICES
      2.4.1. GENERATING PRODUCT DESCRIPTION DATA
      2.4.2. GENERATING KEY-VALUE PAIRS
      2.4.3. GENERATING A GRAPHICAL USER INTERFACE
   2.5. EXAMPLE MANUFACTURING SYSTEM
   2.6. EXAMPLE MANUFACTURING PROCESS
   2.7. EXAMPLE PRODUCT COLLABORATION PLATFORM
3. EXAMPLE OF GENERATING CUSTOMIZED PRODUCTS IN COLLABORATION WITH LIVE DESIGNERS AND AGENTS
4. KEY-VALUE PAIRS

5. COLLABORATION EXAMPLES
  5.1 CUSTOMER-DESIGNER COLLABORATION
  5.2. SHARING ACCESS TO PRODUCT DESCRIPTION DATA
  5.3. REQUESTING ASSISTANCE FROM A DESIGNER
    5.3.1. DIRECT REQUEST
    5.3.2. REQUEST VIA A SEARCH
    5.3.3. REQUEST VIA AN ADVERTISEMENT
    5.3.4. REQUEST VIA EXPLORING
6. PROFILES OF DESIGNERS
  6.1. EXAMPLE PROFILE
  6.2. PARAMETRIC REQUESTS
  6.3. SELECTION OF A PARTICULAR DESIGNER
7. EXAMPLE CHANNELS OF COMMUNICATION
8. EXAMPLE PROCESS OF COLLABORATING WITH A LIVE DESIGNER
  8.1. SELECTING A PARTICULAR DESIGNER
  8.2. HANDLING DESIGN MODIFICATIONS RECEIVED FROM A LIVE DESIGNER
  8.3. HANDLING DESIGN MODIFICATIONS RECEIVED FROM A CUSTOMER
9. RATING AND SCORING
  9.1. BASED ON SKILLS AND QUALIFICATIONS
  9.2. BASED ON PERFORMANCE
  9.3. BASED ON AVAILABILITY
  9.4. OTHER FACTORS
10. ROLE-BASED COLLABORATION PLATFORMS
  10.1. ROLE-BASED COLLABORATION
  10.2. USER ROLES
  10.3. USER PROFILES
  10.4. DESIGNER PROFILES
  10.5. DESIGNER DESIGNS
  10.6. PRODUCT DEFINITIONS
  10.7. ATTRIBUTE REPRESENTATIONS
  10.8. GLOBAL-KEY-VALUES
  10.9. COLLABORATION COMPONENTS
    10.9.1. USER INTERFACE ELEMENTS
    10.9.2 USER INTERFACE ELEMENTS FOR DESIGN AREAS
  10.10. PRODUCT OPTIONS FRAMEWORK
  10.11. ATTRIBUTE ENGINES
  10.12. USER COMPUTERS
  10.13. COLLABORATION SERVER
  10.14. MONITORING SYSTEM'
  10.15. PROCESSORS
11. JOURNALED LIST AND COLLABORATION
12. MANUFACTURE OF CUSTOMIZED PRODUCTS
13. IMPLEMENTATION MECHANISMS

1. General Overview

In some embodiments, an approach for generating customized products in collaboration with live designers and agents of a product collaboration platform is presented. The presented approach for collaboration with live designers is an automated concierge system supported by the product collaboration platform in which live designers assist customers in generating interactive digital designs of the customized products. In some embodiments, the requests for assistance are generated and processed automatically. Selecting the designers who can respond to the requests and designating the selected designers to collaboration sessions are also managed automatically.

A product collaboration platform may be implemented in a computer server, a distributed computer system, a cloud-based system, and the like. The platform may be configured to allow users, designers, agents, customers, and support engineers to design, create, collaborate, and modify digital designs of products such as greeting cards, wedding invitations, water bottles, picture frames, and the like.

Digital designs may be transmitted from a product collaboration platform to manufacturing servers, or manufacturing entities, that may use the received digital designs to manufacture products either digitally or physically. The manufactured product may, in turn, be delivered to recipients. An example computer environment for collaborating and creating digital designs, manufacturing products based on the designs, and delivering the products to recipients is described in FIG. 1-2.

In some embodiments, a product collaboration platform is used to design, create, and order various products. Examples of the products may include digital products, i.e., the products designed and delivered digitally—such as digital gift cards, party invitations in digital forms, digital greeting cards, announcements in digital forms, and the like. The products may also include physical products, i.e., the products designed digitally but delivered as physical things—such as physical t-shirts, physical mugs, physical water bottles, physical picture frames, and the like.

A product collaboration platform may be used to provide various services. Examples of services provided by the product collaboration platform may include supporting creating and collaborating on interactive product designs, processing requests for assistance in creating interactive product designs, processing requests for services such as sending thank-you cards, joining a community of designers and customers that use the platform, and reordering the products. Furthermore, the services may include creating and designing party invitations, greeting cards, gifts, and the like. The services may also include scheduling and planning events that occur periodically, such as birthdays, anniversaries, due dates, and the like. The services may further include planning events such as engagement parties, weddings, baby-shower parties, welcome-home parties, graduation parties, religious-event parties, and the like. Moreover, the services may include sharing pictures and comments with friends, families, acquaintances, and coworkers.

Users of a product collaboration platform may have assigned roles. A role assigned to a user is a function of the role that is assumed, or played, by the user who participates in a collaboration session established to create an interactive digital design. Examples of roles may include a customer role, a graphics designer role, a customer peer role, an agent role, an editor role, and the like. Based on the assigned roles, the users may be granted different types of access to product descriptions of interactive digital designs.

A customer role may be assigned to a customer who is using a product collaboration platform to customize one or more interactive digital designs offered by the platform. A customer may, for example, edit/modify attributes of an interactive object, view a rendering of the customized design, publish the customized design, request help from another user (a designer or a customer support agent) to create or modify an interactive digital design, request a list of modifications that the user proposed for the interactive, digital design, and/or delete or revert some of the modifications of the digital design.

A designer role may be assigned to a designer who is using a product collaboration platform to assist someone else in designing an interactive product design. That may include helping in defining attributes for an interactive digital design, defining default values for the attributes, and/or customizing the design. Additional functions that a graphics designer may perform are described later.

Designers are usually highly skilled and trained graphics experts. The designers may utilize their skills and experiences to help others in designing and customizing products using a product collaboration platform. The designers assisting in designing and customizing the products may be grouped based on their specialties, artistic styles, designing preferences, and the like. The designers may specialize in different design styles, different genres, different esthetic styles, and the like. For example, some designers may specialize in a specific style such as art deco, while other designers may specialize in art nouveau, avant-garde, modern, or abstract expressionism.

Designers may also specialize in different color palettes. For example, some designers may specialize in color palettes that are warm, orange, gold, or soft, while other designers may specialize in color palettes that are cool, cobalt blue, gray, and the like. According to another example, some designers may specialize in color palettes such as blue, teal, green, or gray, while other designers may specialize in color palettes such as pink, red, purple, and the like.

Designers may further specialize in different types of products. For example, some designers may specialize in designs for wedding paraphernalia, baby shower gifts/invitations, wedding anniversary gifts/invitations, while other designers may specialize in designs for birthday party gifts/invitations, and the like. Furthermore, some designers may specialize in home decors, bedroom decors, kitchen decors, and the like, while other designers may specialize in personal items such as jewelry, personal gifts, personal apparel, shoes, and the like. Other specialties and preferences are described later.

An agent role may be assigned to a user who is using a product collaboration platform to help someone else to customize one or more interactive digital designs offered by the platform. An agent may, for example, view an interactive digital design designed by someone else, and provide comments or feedback on the design. An agent may be granted access to a product description for the customized design, and in some embodiments, may modify the attributes associated with the design. Detailed information about roles is provided in FIG. 8.

In some embodiments, a presented approach allows receiving, at a product collaboration platform, a request for assistance from a designer, wherein the request specifies one or more assistance criteria or parameters. The approach allows automatically selecting the designer who may be capable of providing the required type of assistance and designating the selected designer to provide the assistance to a customer.

Selection of a designer who may be able to provide the requested assistance may be performed using many approaches. One of the approaches includes performing a search of a database comprising profiles of designers affiliated with the platform. The search may be performed using, for example, an artificial intelligence based approach (described later) and utilizing the one or more assistance criteria (or parameters) included in the request as search keywords.

Another approach may include using the one or more assistance criteria to determine one or more categories and/or subcategories of designers, computing scores score indicating how well the designers included in the determined categories/subcategories meet the one or more assistance criteria and selecting one or more designers from the determined categories or subcategories based on the computed scores. Additional approaches are described later.

In some embodiments, an approach for generating customized products in collaboration with live designers and agents includes managing user roles of users collaborating with each other using a product collaboration platform. In particular, the approach may include managing interactions between customers and designers who collaborate in customizing interactive digital designs of customized products. The approach also includes managing access to product description data that captures key-value pairs describing the parameters and characteristics of the interactive digital designs as the customer and the designers collaborate on the designs. The key-value pairs are described later.

2. Example Computer Environments

In some embodiments, an approach for generating customized products in collaboration with live designers and agents is implemented in a product collaboration platform. The platform allows users, designers, agents, customers, and support engineers, to, for example, collaborate in designing and creating digital designs of customized products. A customized product may be a digital product, such as a digital gift card, or may be a physical product, such as a physical t-shirt. An example computer environment is described in FIG. 1.

FIG. 1 is a block diagram showing an example environment for designing and manufacturing products. FIG. 1, the other drawing figures, and all of the description and claims in this disclosure are intended to present, disclose, and claim a technical system and technical methods in which specially programmed computers, using a special-purpose distributed computer system design, execute functions that have not been available before to provide a practical application of computing technology to the problem of machine learning model development, validation, and deployment. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

In FIG. 1, users 10 are individuals who create and design digital designs of products; clients 9 correspond to software applications configured to facilitate communications between users 10 and front end servers 14; core services 16 correspond to software applications and tools configured to facilitate creating and designing of the digital designs and generating manufacturing instructions for manufacturing final products based on the digital designs; and manufacturing 18 corresponds to manufacturing servers and applications configured to manufacture, or cause manufacturing, the final products, generate tokens that allow recipients of the final products to request services and access to core services 16, and attach the tokens to, or depict the token on, the final products.

2.1. User Devices

FIG. 1 depicts several examples of users 10. Each of users 10 may use its own, or shared, computer device. Examples of user devices are described later in FIG. 2 (see devices 140A-G).

In some embodiments, examples of users 10 are determined based on the roles that may be assigned to the users. Examples 10A of roles may include a customer, a designer, a client peer, a customer support engineer, a recipient, and the like. Examples of user roles are described in detail in FIG. 8.

2.2. Client Applications

Clients 10 in FIG. 1 refer to client applications that are implemented in client servers and that are configured to support requests received from users 10A. Non-limiting examples of clients 12 may include iOS applications 12A, Android applications 12B, Web applications 12C, and the like.

2.3. Front End Servers

Front end servers 14 refer to computer-based servers that are configured to process requests received from clients 12 and from core services 16. Examples of front end servers 14 include one or more WWW servers 14A, one or more application servers 14B, one or more cryptographic servers 14C. Cryptographic servers 14C may be configured to provide cryptographic services for encrypting/decrypting, transmitting, or otherwise communicating data between the entities depicted in FIG. 1.

2.4. Core Services

Core services 16 in FIG. 1 refer to servers and services implemented in a role-based collaboration platform configured to provide functionalities for creating and designing digital designs, handle collaboration requests, and facilitate the customization requests received from users 10. The role-based collaboration platform is described in detail in FIG. 2.

2.4.1. Generating Product Description Data

Referring again to FIG. 1, a customization process performed by a user, of users 10, and intended to generate a digital design of a customized product is captured in so-called product description data, which then may be translated into a manufacturing description comprising product and manufacturing instructions.

The product and manufacturing instructions may include digital design specifications, data, and code needed to manufacture a custom product. That may include instructions for generating, for example, a 3D geometry for digital final products. This may also include generating instructions for generating 2D and/or 3D patterns that may be used to cut, cast, or form physical components of physical final products. The patterns may be parametric, i.e., they may have parameters that, through encoded relationships, adjust the form of the pattern for a specific need.

For instance, a set of 2D patterns for a t-shirt graded based on size, may become a parametric pattern by interpolating grade curvatures. A single parametric value may set this automatic grading. The single parametric value is usually called a 'size.'

The product instructions may also include models, including 2D and 3D models that are used to form, through additive manufacturing, or subtractive manufacturing, portions of a product. The models may be parametric, i.e., they may have parameters that, through coded relationships, adjust the form of the model for a specific need. For instance, a set of 3D models may represent a bike helmet. Each model may fit a statistically normed human head of a specific age. A coded relationship between the models may allow for interpolation of the set of models for a specific age. A single parametric value may set the automatic interpolation. The single parametric value in this case is usually called an 'age.'

The product instructions may also include material properties such as a physical material used to form a product from a pattern. Some material properties may be parametric, i.e., they may be selected or changed during the manufacturing time.

The properties may also include a body color. For instance, the color of a fabric may be selected for manufacturing a t-shirt. According to another example, the color of a plastic may be selected for manufacturing a bike helmet.

The properties may also include a body texture such as the fabric weave of a t-shirt may be specified to be smooth or slubby. For instance, the surface of a plastic bike helmet may be polished or satin. Each property is necessarily specific to each class of materials. Examples of materials and properties may include a fabric (such as a weave or knit type, a fiber type (cotton, wool, flax, polyester, polypropylene), a thread size, a thread count, a color, an integral design (ikat, knit, tapestry), a bolt width, a selvage type, a surface (hand), and the like.

The properties may also include plastics, which may include sub-properties such as a color, a surface quality (a bidirectional luminance function), a melting point, impact resistance, a forming method (thermoplastic, cast), a type (acrylic, abs, polypropylene, etc.), and the like.

The properties may also include metals, which may include sub-properties such as a type (aluminum, steel, copper, brass, etc.), a color, a surface quality (e.g., a bidirectional luminance function), a melting point, a tensile strength, a shear strength, a toxicity, and the like.

The properties may also include non-woven specified by a type (paper, felt, Tyvek, etc.), a color, a surface quality (e.g., a bidirectional luminance function), a surface type (hot pressed, natural, textured, etc.), a weight per square meter, an acid content, a compatible media, coating, and the like.

The properties may also include metamaterials which may be described as a combination of multiple materials created during a manufacturing process. For instance, during a fused deposition manufacture, plastics with a variety of properties may be mixed to provide a physical product with gradations of flexibility, durometer, and the like. According to another example, during laser sintering of metals, a mix of metal alloys with a variety of properties may be deposited, resulting in a product composed of gradations of metallic properties. According to yet another example, during high resolution uv-printing, layers of the uv-cured material with different refractive indices may be deposited, resulting in a large variety of optical effects.

The properties may also include embellishment such as a trim-color, designs, and applied ornaments. The trim colors may indicate the color of the edging around the sleeve of a t-shirt, the color of the trim around the base of a bike helmet, and the like.

The designs may indicate a custom printed front of a t-shirt, a custom thermal printed design to the side of a bike helmet, and the like.

The applied ornaments may indicate rhinestones on a t-shirt, holographic spangles on a bike helmet, and the like.

Some properties may apply to a large class of products and may allow for a limited set of properties to be transferred from one product to another. Other properties may be specific to a particular product or manufacturing method.

It may be appreciated that much of the novel art of the system and method is in enumerating the constraints imposed by manufacturing a specific custom product and crafting these constraints as a set of product option key-value pairs. These manufacturing constraints are propagated through the entire system and method, and by using these product option key-values, allowing for the manufacturing of a series of custom products that meet these physical constraints.

Referring again to FIG. 1, in some embodiments, core services 16 refer to services implemented in a role-based collaboration platform. In the depicted example, core services 16 may be provided by one or more real-view (RLV) servers 16A and a product option framework 16AA. Both RLV servers 16A and product option framework 16AA may use one or more data tier databases 16B, including RLV Data 16C, a product options database 16D, a transaction database 16E, and the like. Examples of the RLV approaches are described, for example, in U.S. Pat. Nos. 8,856,160, 9,436,963, 8,654,120, 8,712,566, 8,958,633 B2, and 9,436,963; and U.S. patent application Ser. Nos. 17/193,512, 17/143,955, 17/038,659, and 16/867,898.

In some embodiments, core services 16 may also utilize internal tools 16F, such as a "Phlow" computational photographical tools 16E, a customer support tools 16G, a launch pads tools 16H, and the like.

Product option framework 16AA is also referred to as a persistent design data framework. The framework data may include a product options set, which may include a set of product options pertaining to a specific product type. In some embodiments, depicted in FIG. 2, a set of product options contains the product instructions generated by, for example, a product option framework 110 and collaboration components 106, shown in FIG. 2, for manufacturing, or producing, the product. Examples of the product option frameworks are described, for example, in U.S. Pat. Nos. 8,856,160, 9,436,963, 8,654,120, 8,712,566, 8,958,633 B2, and 9,436,963; and U.S. patent application Ser. Nos. 17/193,512, 17/143,955, 17/038,659, and 16/867,898.

Referring again to FIG. 1, product option framework 16AA is configured to provide services for transforming ProductOption key-value pairs (i.e., manufacturing constraints) from one product to the other. Transforming the ProductOption key-value pairs from one product to another may require, for example, transforming the color space (i.e., sRGB to CMYK US Web Coated (SWOP) v2), transforming an image from raster to vector, and/or resizing the image for the fit. An example use case of the product option framework is described in detail in FIG. 2.

In some embodiments, there are two basic types of product instructions (1) fixed (that include the instructions for the product which are fixed and not customized), and (2) custom (that contain the logic to transform a user interface parameter into a product instruction).

In some embodiments, the product option set contains the logic to enumerate each customizable option in a manner that presents a complete user interface to change the parametric product instructions.

The instructions for manufacturing a customized product are usually parametric. The parameters include the size of the customized product (this can be multi-dimensional, and include width, height, depth). The parameters may also relate to human sizes or ages. The parameters may also be custom and based on biometric information.

The parameters may also include a component body color, a component body texture, a trim body color, a trim body texture, a design area, and the like.

2.4.2. Generating Key-Value Pairs

In some embodiments, a product option may be represented as a key-value pair. The key-value pair is a label that may span individual products and represent a class of products. The keys of pairs may include a material type, a color, a size, and the like.

The value in a key-value pair is a specific discrete or continuous value that sets a manufacturing instruction. Examples of discrete (enumerated) values may include a discrete type of fabric such as cotton, cotton-polyester blend, silk, and the like. The discrete values may also include specific colors, such as white, navy, black, and the like.

Examples of continuous values of key-value pairs may include a single element, such a length or a ribbon, a vector, such as a size of a frame for a print (width (in inches)) or a height (in inches)), or the size of a box for the European countries, such as a size of a box for the EU (width (in millimeters), height (in millimeters), depth (in millimeters)).

The values may also reference a known file type, such as an image for the design on a t-shirt, such as an embroidery file for the back of a jacket, such as an engraving design for a bracelet, and the like.

In some embodiments, values in key-value pairs may include a set of graphic primitives for a design, such as an image, a line, a circle, a rectangle, a text, a group, and the like.

The product option key-values may have default values. Default values are pre-set values that will produce a product without changing any key-value pairs through customization. When key-values are changed they may produce a product option framework event chain. A product option framework event chain is a journal of each key-value change ordered in time.

A product type may itself be represented by a product option key-value. Using this option type, one product type may be associated with another product type through a well-known relationship.

In some embodiments, a product option framework event chain includes one or more products, and the chain may represent or memorialize an event. The products may represent or memorialize an event. Examples of events may include invitations, save the date cards, birthday cards, birthday gifts, anniversary cards, birth announcements, RSVP cards, holiday cards, holiday gifts, thank-you cards, get-well cards, and the like.

Many products fit into an event chain. For example, the products that fit into a wedding event may include the following products: save the date products, invitations, RSVPs, bachelor party invite products, bachelorette party invite products, party favors products, gift registry cards, place cards, napkins, wedding programs, wedding gifts, thank-you cards, wedding keepsake photos, and the like.

Examples of products that may fit into a birthdate event may include the following products: invitations, RSVPs, party bags, party keepsake photos, and the like.

In some embodiments, in a product option set event chain, a key-value pair encodes the next product in the chain. For example, an invitation may be chained to an RSVP card. A key-value may also encode the role for the chained event. For example, a chained RSVP card key-value may further include a recipient of the invitation as the sender role for the RSVP card.

A key-value pair may also encode the shared properties used to set the chained product's properties. For instance, a design for the invitation may be shared with the RSVP card. A key-value may also encode the timing for the chained product. Typically, the event chain properties are custom (parametric), and they may be changed by a product designer to fit a specific product set.

2.4.3. Generating a Graphical User Interface

In some embodiments, a product option framework is configured to generate a product option framework user interface. Accordingly, each product option set is associated with logic and code to build a user interface element for each parametric product option. Furthermore, each product options set contains style hints so that each user interface element may be artfully placed to produce a high quality user experience.

Typically, user interface elements are designed to match each class of values found in all products covered by a product option framework. New user interface elements may be added as the product categories expand. The user interface elements may include a design view, a color editor, a font editor, a size selector, a texture selector, a text editor, a fabric swatch selector, a product real view, and the like.

In some embodiments, a product options framework cooperates with a user product renderer that may be implemented in, for example, a RealView server 16A. The user product renderer may be configured to render views of a custom product as though it is already manufactured. Typically, it uses a product option set of key-values as input. It creates one or more run-time assets using computational photography of the manufactured product.

2.5. Example Manufacturing System

Referring again to FIG. 1, manufacturing instructions may be communicated from core services 16 to manufacturing 16, which may include one or more manufacturing servers 16AAA. Servers 16AAA may receive the manufacturing instructions, process the instructions, and communicate with a vendor manufacturing application 18A to generate, for example, manufacturing data, operator directions, tool/machine codes, and the like. The application may also generate information about an order state, a packing slip, a production sheet, and the like. Some of that information may be communicated to a carrier (shipping) service selected to deliver the final products to the recipients.

For creation of RealView assets, a final product may be manufactured using markups. A markup for, for example, a body color of a product may be made by specifying a distinct and separate color for BodyColor key-value. A markup for the trim color of a product may be made by specifying a distinct and separate color for, for example, a TrimColor key-value pair. A markup for a design area of a product may be made by specifying a specific marker type (e.g., a removable linear markup, a digital markup, or a digital field markup) for a design-area image.

Construction of a so-called Product RealView geometry may be performed using computational photographic techniques using products manufactured with markup. For example, a BodyColor area of a surface may be recognized and layered as a custom computer graphics shader for rendering light, color, and texture. Each TrimColor area's surface may be recognized and layered as a custom computer graphics shader for rendering light, color, and texture. Rendering of the Product RealView may be performed by setting its product option key-values, and shading each of its constructed layers.

2.6. Example Manufacturing Process

A manufacturing process may pertain to manufacturing a digital product as well as manufacturing a physical product. Since the manufacturing instructions for generating a product are generated based on a plurality of key-value pairs for a digital design of the product, in some situations, the same manufacturing instructions may be used to manufacture the digital product as well as to manufacture the physical product.

In some embodiments, a product options framework (described in detail in FIG. 2) builds an interface for a key called OutputStyle. The interface for the OutputStyle key may allow a designer (or any other collaborator) to select values for the media for the presentation of an interactive design. The choices may include a JPEG_Image, a GIFF_Image, and an H264_Video.

If a designer chooses the GIFF_Image option, then the product options framework may send the instructions to the manufacturing system to traverse each of the key-values in the KeyValueJournal, and for each key, and use a User Product Renderer to render the state of the custom physical product with that modification as images in the sRGB 32-bit RGBA format. Subsequently, the manufacturing system may store the renderings in a local image cache.

Then, the manufacturing system may traverse the images stored in the local image cache and determine an optimal color palette for that collection of images.

Subsequently, the manufacturing system may convert the images in the local image cache from 32-bit RGBA format to 8 bit Indexed color.

Then, the manufacturing system may embed a digital watermark which encodes the input KeyValueJournal's UUID in the 8 bit indexed color image cache.

Next, the manufacturing system may begin encoding the image file. For example, the manufacturing system may write the header bytes; write the Logical Screen Descriptor bytes; write the found color palette as a gif Global Color Table; write the gif 8 bit character application name; and embed metadata as a comment (or a watermark) which encodes the input KeyValueJournal's UUID.

Next, the manufacturing system sets a FrameCount to 1 and proceeds to processing each frame in the image file. The processing includes checking if there is an image in the 8 bit indexed color image cache; and if so, then the manufacturing system continues; otherwise, the manufacturing system proceeds to taking the next image.

To continue, the manufacturing system writes the gif Graphic Control Description for the FrameCount, and then processes the first 8 bit indexed color image cache into blocks of 255 LZW compressed bytes.

Next, the manufacturing system writes the compressed bytes, and removes the first image from the 8 bit indexed color image cache. Then, the manufacturing system increments the FrameCount and repeats the process for the next frame.

Once the manufacturing system processes all frames, the manufacturing system writes the file terminator (such as an ASCII code for zero) to the image file and outputs the manufactured GIF product.

At this point, executing the manufacturing instructions for the purpose of manufacturing the product ends, and the manufacturing of the product is completed.

2.7. Example Product Collaboration Platform

In some embodiments, the approach for generating customized products in collaboration with live designers and agents is implemented in one or more computer systems that host a product collaboration platform. Alternatively, the approach may be implemented in one or more computer systems that communicate with the collaboration platform but that do not actually host the platform itself. For the clarity of the description, it is assumed that the computer environment supporting the approach presented herein is implemented in the product collaboration platform.

Figure 2:
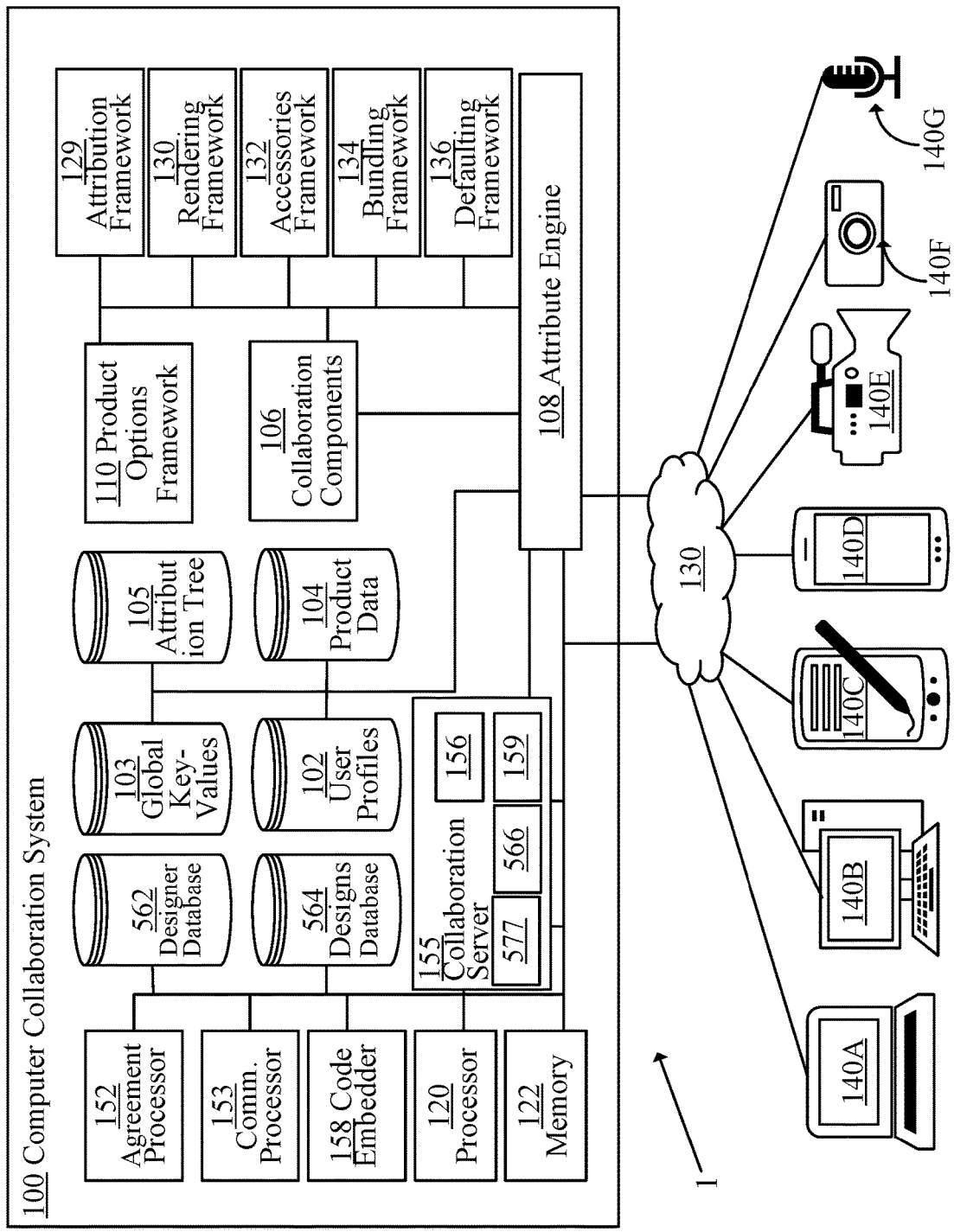
FIG. 2 is a block diagram showing an example of a role-based collaboration platform.

FIG. 2 is a block diagram showing an example of a role-based collaboration platform 1. In the example depicted in FIG. 2, a computer collaboration system 100 includes a user profiles database 102, a global-key-values database 103, a product data definitions database 104, an attribution trees database 105, collaboration components 106, a product options framework 110, an attribute engine 108, one or more processors 120, one or more memory units 122, and one or more frameworks 129-136.

Furthermore, computer collaboration system 100 includes a collaboration server 155, one or more designer databases 562, one or more design databases 564, an agreement processor 152, a communications processor 153, and a code embedder 158. Computer collaboration system 100 may communicate directly, or via one or more communications networks 130, with one or more user computers 140A-140G, all described in detail later.

In some embodiments, collaboration server 155 comprises a monitoring system 156, a request analyzer 159, an interactivity module 577 and a designer selector 566. Additional modules may also be included in collaboration server 155. Details about collaboration server 155 are described later.

Computer collaboration system 100 shown in FIG. 2 is provided herein to illustrate clear examples and should not be considered as limiting in any way. Other computer collaboration systems may include additional components such as computer servers, various input/output devices, and additional software and/or hardware components that are not depicted in FIG. 2. Other computer collaboration systems may be implemented in cloud-based systems, distributed computer networks, and the like. Other computer collaboration systems may include fewer components than example computer collaboration system 100 shown in FIG. 2. Computer collaboration system 100 is described in detail later.

3. Example of Generating Customized Products in Collaboration with Live Designers and Agents For the purpose of providing clear examples, a designer is a highly skilled and trained individual who is affiliated with a support team of a collaboration computer system, while a support agent is any member of the support team. Some designers may also be support agents or support engineers. However, for the purpose of simplifying the examples, the references are made to the designers as a group of individuals who are available to provide assistance to customers of the collaboration platform.

Figure 3:
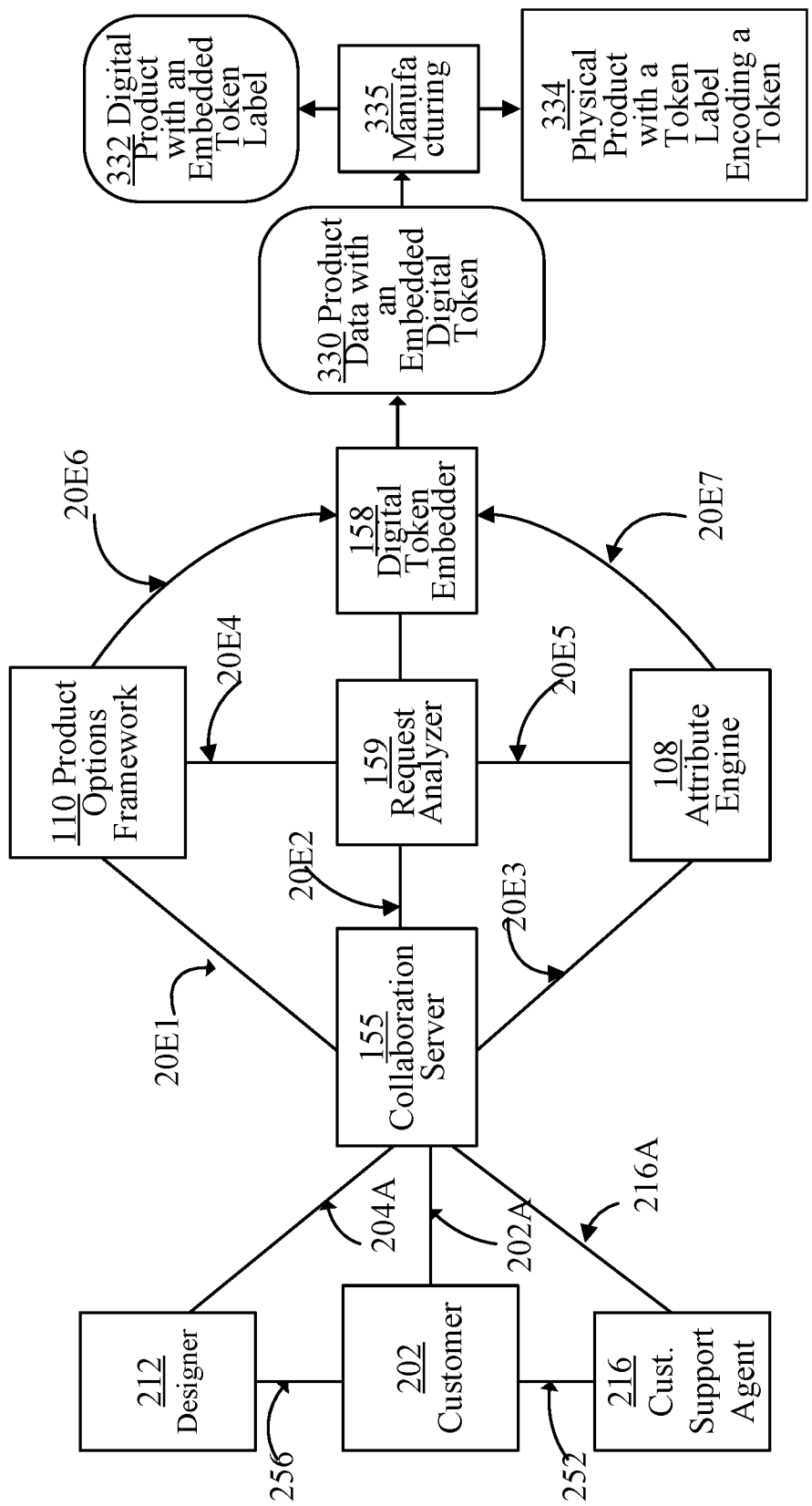
FIG. 3 is a block diagram showing a collaboration example implemented in a product collaboration platform.

FIG. 3 is a block diagram showing a collaboration example implemented in a product collaboration platform. In the depicted example, a customer 202 collaborates with a designer 212 and/or a customer support agent 216. The roles of individuals 202, 212 and 216 and the different ways of collaborating are described in detail in FIG. 8. In other examples, customer 202 may contemporaneously collaborate with several peers, several support agents, and/or several designers.

In FIG. 3, customer 202 communicates with designer 212 via a communications session established along link 256 and communicates with customer support agent 216 via a communications session established along link 252. The data communicated by designer 212 are transmitted to collaboration server 155 via a link 204A; the data communicated by customer 202 are transmitted to collaboration server 155 via a link 202A; and the data communicated by agent 216 are transmitted to collaboration server 155 via a link 216A.

In some embodiments, monitoring system 156 of collaboration server 155 intercepts a data stream exchanged along link 256 and/or intercepts a data stream exchanged along link 252. Collaboration server 155 may cooperate with product options framework 110 and transmit (20E1) data to product options framework 110. Collaboration server 155 may also collaborate with attribute engine 108 and transmit (20E3) data to collaboration server 155.

Furthermore, collaboration server 155 may cooperate with request analyzer 159 and transmit (20E2) a request made by customer 202 for, for example, assistance from designer 212 (or agent 216), to request analyzer 159.

In some embodiments, request analyzer 159 may request and receive (20E4) the data from product options framework 110. Furthermore, request analyzer 159 may request and receive (20E5) the data from attribute engine 108. Request analyzer 159 may also request information from designer database 562, designs database 564, and the like. Processing of the request is described in detail later.

Collaboration server 155, product option framework 110, attribute engine 108 and request analyzer 159 may cooperate with each other. This may include journaling a plurality of key-value pairs generated during the interactive session during which designer 212, customer 202 and customer support agent 216 create the interactive digital design. This may also include transforming ownership and license agreements, embedded in the plurality of key-value pairs journaled during a collaboration session, into, for example, a graph-network and then into an ownership-agreement tree. This may also include evaluating the ownership-agreement tree with respect to communications channels 256 and 252, established between customer 202, designer 212 and customer support agent 216, respectively to determine whether any communications between any users 202, 204 and 216 violated any constraints included in the ownership-agreement tree.

Collaboration server 155, product option framework 110, attribute engine 108 and request analyzer 159 may also cooperate with each other when a request for ordering, for example, a physical product corresponding to the interactive digital design is received. In response to receiving the request, collaboration server 155, product option framework 110, attribute engine 108 and request analyzer 159 may collaborate to generate, determine, or retrieve, a token 330 that represents a plurality of key-value pairs for the interactive design.

In some embodiments, digital token 330, capturing a plurality of key-value pairs for the product, may be stored at a location in a storage unit. The location may be identified using a hyperlink or a UUID, described before. The generating of the token and storing of the token may be performed by, for example, a code embedder 158, depicted in FIG. 2.

In some embodiments, the hyperlink pointing to the location at which the plurality of key-value pairs is stored, or the UUID, is communicating to a manufacturing server 335. Manufacturing server 335 may retrieve, based on the hyperlink or the UUID, the plurality of the key-value pairs, and translate the pairs into, for example, manufacturing instructions for manufacturing an actual product. Then, manufacturing server 335 may use the manufacturing instructions to manufacture, based on the key-value pairs, an actual product. Depending on the manufacturing instructions, the actual product may be either a digital product 332 or a physical product 334.

Digital product 332 may be a digital greeting card, a digital invitation, or the like. Physical product 334 may be a physical water bottle, a physical mug, or the like.

In some embodiments, manufacturing server 335 generates a token that captures token data and describes how a user may request services related to the manufactured product, and how to access a product customization platform. The token, i.e., token digital data, may be encoded in a token label.

In some embodiments, if the actual product is digital product 332, then a token label is a token digital label pasted into an image of digital product 332. However, if the actual product is physical product 334, then a token label is a token physical label attached to the physical product 334.

4. Key-Value Pairs

In some embodiments, a method for generating a customized product in collaboration with live designers or agents comprises managing product description data created and maintained for an interactive design for the product. The product description data for interactive design may include data that digitally captures the characteristics and parameters of the interactive design. Product description data may be used to manufacture the customized product corresponding to the interactive design. Product description data may be also used to generate a graphical visual representation of the interactive design that is capable of custom manufacture with a plurality of variable product attributes. Product description data may be parsed by a collaboration server to identify a plurality of global-key-values pairs that are journaled within the product description data for a plurality of contributors.

A global-key-values pair usually includes a key and a value associated with the key. The global-key-values pair is referred to as global because it is global to a current collaboration session. While the key has a persistent meaning across all transactions, the value is scoped to a specific collaboration session. Furthermore, all global-key-values pairs created and modified during a particular collaboration session are journaled and saved for that particular collaboration session.

Based on, at least in part, the plurality of global-key-values pairs, an ownership-attribution tree is constructed. Based on, at least in part, the ownership-attribution tree, manufacturing instructions for customizing the physical product and according to the plurality of variable product attributes are generated. The manufacturing instructions may be transmitted to a product customization server to cause a manufacturing entity to proceed with generating a customized product based on the manufacturing instructions.

Examples of the global-key-values pairs may include: an age restriction key-value that includes an age restriction key and an age value; a content lock key-value that includes a content lock key and a content lock key value; a blacklist key-value that includes a blacklist key and a blacklist; a whitelist key-value that includes a whitelist key and a whitelist; an ownership key-value that includes an ownership key and a user universally unique identifier (user ID); a copyright key-value that includes a copyright key and a user ID; a license key-value that includes a license key and a universally unique identifier for a specific license agreement held between an owner or a primary designer and a computer collaboration server; a customer support key-value that includes a support key and a support agent contract identifier; and an attribution key-value that includes an attribution key and a universally unique identifier that references a set of software instructions for manufacturing to apply a marking on a product as may be directed by copyright or licensing agreements. Other global-key-values, such as key-values that are specific to an implementation or a line of products, may also be implemented.

In some embodiments, the product description data for the interactive design is generated as one or more modifications to the interactive design are received from one or more user interfaces and are used to update the interactive design.

The plurality of global-key-values pairs journaled within the product description data may be originated when a customization session for customizing the interactive design is initiated. The plurality of global-key-values pairs may be updated each time when a contributor, who has been granted a valid license and who participates in the customization session, provides modifications to the interactive design. The plurality of global-key-values pairs may carry license agreement information and restriction information specific to the customization session and the interactive design.

In some embodiments, upon detecting that no further modifications for the interactive design are provided, the plurality of global-key-values pairs journaled within the product description data are stored in a global-key-values database.

5. Collaboration Examples

Computer collaboration system 100, shown in FIG. 2, may support a variety of collaboration sessions. The collaboration session may be established between two or more users. The types of collaboration sessions may depend on the roles that are assigned to the users who participate in the sessions. For example, a customer may collaborate with a customer support agent, engage in a creative work with a graphic designer, ask an agent or a designer for help in modifying a custom product template, collaborate with the customer's peers, watch a designer create a design in real time, watch a designer demonstrate how to create a design offline, watch a preview of how to create a specific custom product, and/or watch an edited set of journaled actions performed by a graphics artist to learn how to solve a specific design problem.

5.1. Customer-Agent Collaboration

A customer may collaborate with a designer, also referred to as a live designer or an agent. For example, a customer may ask for assistance from a designer to help the customer to customize an interactive design and show the customer how the designer would modify the interactive design to achieve the design that the customer would like to see.

Examples of collaboration sessions between a customer and a designer may include situations when a customer is exploring a product web page in a marketplace site and needs help tweaking the design, such as a party invitation, a mug design, and the like. Another example may include a situation when a customer is exploring a product web page in a marketplace site depicting a picture of a mug and wants to tweak the design. Other examples may include a situation when a customer found an interesting design of a wedding invitation, a holiday card, a custom blanket, or the like, but does not know how to modify the design. In some other situations, a customer wants to contact customer service or call a help desk and ask for assistance in using the collaboration tools.

5.2. Sharing Access to Product Description Data

Customization of an interactive design in collaboration between a customer and a live designer may include creating the design and modifying the design by both the customer and the designer. To be able to customize the design, the customer and the designer may share access to product description data associated with the design.

In some embodiments, to be able to collaborate on an interactive design with a graphics designer, a customer may request a collaboration session between the customer and the designer and supported by a collaboration platform. Once the session is established, the customer and the designer may share access to product description data that are associated with the interactive design and that include corresponding key-value pairs.

A collaboration session may support a communications session between the customer and the designer, a modification session for modifying an interactive design by the customer, a modification session for modifying the interactive design by the designer, and the like. The sessions may be merged into one collaboration session. Examples of different sessions are described in FIG. 6.

A modification session for modifying an interactive design may be established for each customer or designer, or both.

To initiate a modification session for a customer, a computer collaboration system may generate a user interface for the customer. The interface may be generated based on, at least in part, information stored in a customer profile. That information may include information indicating the customer's role. The user interface may include the functionalities that are specific to the customer, and that allow the customer to collaborate with others, modify the attributes of an interactive design, store the modifications in a product description associated with the interactive design, store the modifications in a journaled list of modifications for the interactive design, prune and reorder the journaled list, and publish the rendering of the modified interactive design.

In some embodiments, the computer collaboration system may cause displaying, in a user interface executing in a user device of the customer, an interactive design along with annotations representing attributes, attribute groups and the locations within the design to which the attributes apply. The attributes, default values for the attributes and default ranges for the values for the attributes may be provided by an attribute engine which may be part of the computer collaboration system. The attribute engine may define and/or filter the attributes according to constraints provided by manufacturers, designers, or system administrators.

In response to receiving, in the user interface, a rendering of the interactive design with the annotations, a user may select, using the functionalities of the user interface, a specific attribute or a specific attribute group at a specific location within the depiction of the interactive design and select or adjust a value associated with the attribute. For example, the user may select a width-attribute and use a slider object, provided by the user interface, to set a new value for the width parameter. The new value of the parameter may be transmitted as a serialized key-value pair to a product options framework.

In response to receiving, in the user interface, the customer may also request assistance from the designer. Examples of various ways of requesting the assistance from the designer are described in FIG. 4.

If a customer requests assistance from a designer, a collaboration platform may allow the customer and the designer to share access to the product description data that are associated with the interactive design and that include the corresponding key-value pairs. For example, upon receiving the request, the platform may initiate a modification session for the designer and may generate a user interface for the designer. The interface may be generated based on, at least in part, information stored in a designer profile. That information may include information indicating the designer's role. The user interface may include the functionalities that are specific to the designer, and that allow the designer to collaborate with others, modify the attributes of an interactive design, store the modifications in a product description associated with the interactive design, store the modifications in a journaled list of modifications for the interactive design, prune and reorder the journaled list, and publish the rendering of the modified interactive design.

The collaboration platform may allow either the customer or the design access the product description data, or both. However, the switching between the access may be implemented each time either the customer or the designer requests the access to the product description data.

The switching between the access may be performed multiple times, usually until the customer and the designer are satisfied with the resulting interactive design or until they decide to terminate the collaboration session. At that time, serialized key-value pairs for the interactive design at a location on a server or in a cloud system are stored and a hyperlink to the location where the pairs are stored is created. Upon receiving a serialized key-value pair, the product options framework may store the serialized key-value pair in a journaled list of modifications for the interactive design.

Upon receiving a request to view the Journaled list from the user, the attribute engine may provide the Journaled list to the user interface executing on the user device and cause the user interface to display the Journaled list. At this point, the user may review the modifications included in the Journaled list, reorder the modifications included in the list, remove some modifications from the list and/or request applying of the modifications included in the list to the interactive object. The user may also request generating a rendering of the current interactive design. If the rendering of the current interactive design is completed, the user may view the rendering in any of a plurality of available views.

In some embodiments, the user may accept the rendered depiction of the modified design and request that the customized design be sent to a manufacturer or a distributor. Then the user may place an order for an actual product that is based on the customized design provided to the manufacturer or distributor.

5.3. Requesting Assistance from a Designer

Suppose that a user would like to design a greeting card that has a particular floral pattern as a background. Suppose that the user likes modern floral patterns; however, the user does not have access to such patterns and does not know the name of such patterns. Furthermore, suppose that the user would like to use a modern floral pattern that is expressed in a pastel color palette. Moreover, suppose that the user would like to superimpose a textual arrangement in front of the floral pattern, and that the textual arrangement is provided in a PDF format. In addition, suppose that the user would like to add, to the greeting card, a picture of his children, and that the picture is provided in a JPEG format. Finally, suppose that the customer is rather inexperienced in designing greeting cards.

One solution to this problem is to invite the user to access a product collaboration platform, described herein, and then allow the user to request assistance from an experienced designer to collaborate with the user on creating the customized greeting card described above. Examples of different ways of getting in touch with the designers available to collaborate are described in FIG. 4.

Figure 4:
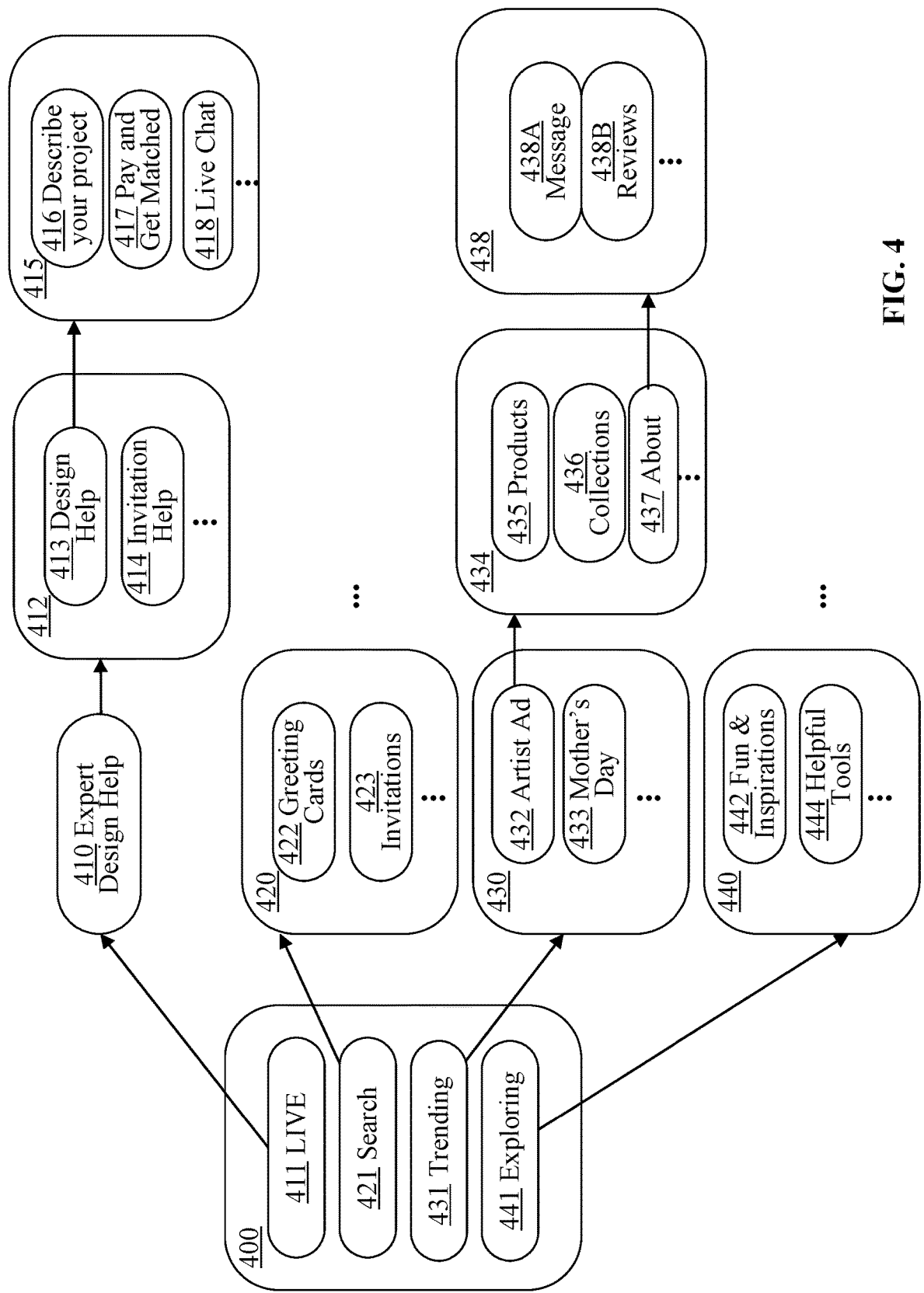
FIG. 4 is a block diagram showing examples of requesting assistance in collaboration using the product collaboration platform.

FIG. 4 is a block diagram showing examples of collaboration with designers and agents. The depicted example illustrates different ways for users to get in touch with designers. However, the depicted examples are provided to merely illustrate some options and should not be viewed as limiting in any way. Other options may also be implemented, and so are other types of graphical interfaces used to provide and present the options may also be implemented.

An example depicted in FIG. 4 shows a GUI 400 that may be generated on a user computer, such as devices 140A, 140B, 140C, and 140D shown in FIG. 2. Generating GUI 400 on the user computer may be initiated once a user device of the user computer establishes a communications connection with computer collaboration system 100 shown in FIG. 2.

In some implementations, once the communications connection is established, collaboration server 155, which is part of computer collaboration system 100 shown in FIG. 2, generates data to be used by the user computer to generate GUI 400. In some implementations, the data may be generated by collaboration server 155 itself; in other implementations, the data may be generated by one or more modules of collaboration server 155. For example, the data may be generated by an interactivity module 577.

Once the data for generating GUI 400 is generated, collaboration server 155 communicates that data to a user device via a communications connection already established between the user device and computer collaboration system 100.

Upon receiving the data, the user device launches a browser, uses the data to generate GUI 400 and displays GUI 400 in the browser running on the user device.

In some implementations, GUI 400 includes a set of interactive buttons, including, for example, a LIVE button 411, a Search button 421, a Trending button 431, and an Exploring button 441. Other interactive buttons may also be implemented. In other implementations, different buttons or different arrangements of the buttons may be provided. The types and arrangements of the GUI and the interactive buttons depend on the implementation and should not be viewed as limiting in any way.

5.3.1. Direct Request

In the example of FIG. 4, LIVE button 411 is implemented to allow a user to directly request help from a designer or designers.

In some implementations, LIVE button 411 may be used to initiate collaboration with any designer or with a particular designer. By selecting, for example, LIVE button 411, a collaboration platform provides a mechanism for contacting a designer, or designers, directly. In the example shown in FIG. 4, this option is indicated using a LIVE option 411.

Upon selecting LIVE option 411, the customer may be redirected to a web page, or a submenu, including options such as: an expert design help, or any other web page allowing the customer to specify the type of help that the customer requires. For example, the customer may be redirected to a web page, or a submenu, displaying an expert design help 410, from which the customer may access a type of help selector 412.

Help selector 412 may allow the customer to select the type of help or assistance that the customer requires. In the example depicted in FIG. 4, the customer may choose between a help in the design 413, a help with creating an invitation 414, and the like. The examples shown in FIG. 4 are not to be viewed as limited in any way.

Once the customer selects a type of help s/he requires, the customer may be redirected to a web page, or a submenu, that would provide a GUI allowing the customer to describe (416) his project, to pay and get matched (417) with a particular designer, to start (418) a live chat with a designer, and the like. The examples shown in FIG. 4 are not to be viewed as limited in any way.

Suppose that a customer needs some assistance in creating a floral invitation with embedded images. Suppose that the customer has accessed a product collaboration platform and is able to request assistance from a designer using a LIVE 411 option. Upon selecting the option 416, i.e., an option for describing the project with which the customer needs some help, the customer may specify that, for example, the requested designer would have to be an experienced illustrator who is familiar with modern floral patterns. The customer may also specify that the designer would have to be familiar with the modern floral patterns expressed in pastel color palettes. Furthermore, the customer could specify that the designer would have to know how to edit the patterns, images, vectors of pixel data for the images, resize and rescale images, superimpose images, creating a collage of patterns, images, and text data, reposition components of the collage image, and the like.

However, the above criteria may not be the only criteria and not the only characteristics of the designer that should be considered. Additional characteristics may include, for example, availability of the designer, ratings of the designer, the designer's workload, the designer's license allowing the designer to accept the work assignment, the designer's preference, and the like. For example, a Designer1 may be available on Tuesdays-Wednesdays from 8 AM to 11 AM Eastern Time, while a Designer2 may be available Wednesday-Friday from 12 Noon to 5 PM Pacific Time. Hence, a customer who has an urgent project on Tuesday in the morning Eastern Time might want to consider receiving help from the Designer1. Examples of characteristics of designers are described in FIG. 5A.

Identifying one or more designers who possess the above listed qualifications may be performed using various approaches. Examples of the approaches are described in FIG. 5A-5B.

5.3.2. Request Via a Search

In some embodiments, a customer may request assistance from a designer as the customer is performing a search of products or product categories. For example, the customer may select Search button 421 from GUI 400 displayed on a display device of a user device or the customer.

Upon selecting Search button 421, the customer may be redirected to a web page 420, or a submenu, that allows the customer to browse, for example, various products and/or categories of the products. Non-limiting examples of the product categories include greeting cards 422, invitations 423, and the like. The depicted examples should not be viewed as limited in any way.

As the customer browses the product categories in web page 420, the customer may be presented with a "help" button (not shown in FIG. 4), a "chat" button (not shown in FIG. 4), or any other element that would allow the customer to request help or assistance from a designer.

5.3.3. Request Via an Advertisement

In some embodiments, a customer may request assistance from a designer by selecting an advertisement that is displayed in a GUI and that features a particular designer. For example, the customer may select Trending button 431 from GUI 400 displayed on a display device of a user device or the customer.

Upon selecting Trending button 431, the customer may be presented with various options, including a menu 430 comprising an advertisement 432 featuring a particular artist (e.g., a particular designer), an announcement of an upcoming holiday such as a mother's day 433, and the like.

In some embodiments, upon selecting advertisement 432 featuring a particular artist, the customer may be redirected to a web page 434, or a submenu, featuring products 435 in which the artist specializes, collection 436 of the products designed and/or created by the artist, an "about" summary 437 of the artist's qualifications, and the like.

Suppose that the customer selected "about" summary 437 to inquire about the artist's qualifications. In response to the selection, the customer may be presented with a web page 438, or a submenu, that could allow the customer to leave (438A) a message to the artist, review (438B) the artist's qualifications, ratings, availability, and the like.

5.3.4. Request Via Exploring

In some embodiments, a customer may request assistance from a designer as the customer selects, for example, Exploring button 441 in GUI 400.

Upon selecting Exploring button 441, the customer may be redirected to a web page 440, or a submenu, via which the customer may explore various types of features of the collaboration platform. Non-limiting examples of the different features may include a Fun and Inspirations option 442, a helpful tools option 444, and the like.

As the customer browses the different features in web page 440, the customer may be presented with a "help" button (not shown in FIG. 4), a "chat" button (not shown in FIG. 4), or any other element that would allow the customer to request help or assistance from a designer.

6. Profiles of Designers

For each designer available for collaboration with users of a product collaboration platform, the platform may maintain a designer profile. A designer profile for a designer is a body of information that describes characteristics of the services provided by the designer.

6.1. Example Profile

Figure 5A:
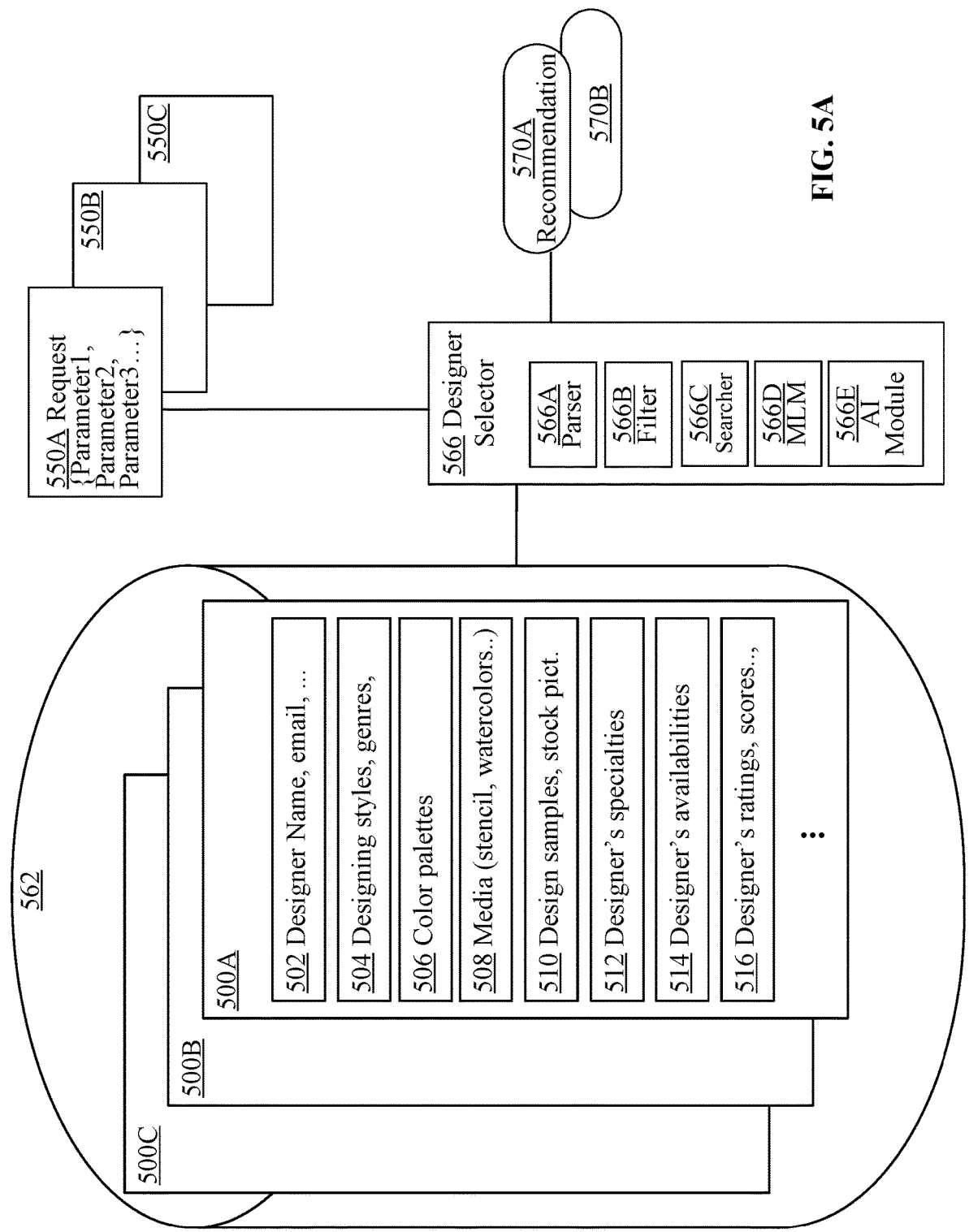
FIG. 5A is a block diagram showing an example of a designer selection process based on requests and designer profiles implemented in a product collaboration platform.

FIG. 5A is a block diagram showing an example of a designer selection process based on requests and designer profiles implemented in a product collaboration platform. A collection of designers' profiles 500A, 500B, 500C, etc. may be stored in profile database 562, which may be part of collaboration system 100 or which may be stored in a separate storage system available to collaboration system 100.

Content of a profile 500A of a designer may vary and may depend on the implementations. Examples of the content described in FIG. 5A are provided to merely illustrate some examples. The examples should not be considered as limiting in any way.

In some embodiments, designer's profile 500A includes a designer's contact information 502, which may include the designer's name, email address, and the like.

Designer's profile 500A may also include information about the designer's preferences, styles, genres 504, and the like.

Designer's profile 500A may further include information about the designer's color palettes, and color preferences 506.

Designer's profile 500A may also include information about the designer's media 508, the designer's samples 510, the designer's specialties 512, the designer's availabilities 514 (for example, it may include indications of the days on which the designer is available, the times during which the designer is available, the designer's response time, the designer's promptness, and the like), the designer's ratings, scores 516, and the like.

A designer's profile may also include an interface for providing and displaying feedback and comments received from others and pertaining to the designer, feedback for individual customers who interacted with the designer using the collaboration platform, and the like. The profile may also include information about the popularity of the designer, his ratings, his scores, and the like.

A designer's profile may also include information about the designer's popular designs, the designer's favorite subjects, and the like.

Designers' profiles may be viewed as metrics, or may be used to generate metrics, used to rank, and evaluate the designers. More specifically, the metrics may be used to determine a broad set of categories of what the designers do, determine specific ways of quantifying and qualifying the designers' skills, determine how the application of the designers' skills and metrics affects the design processes, and determine availability and accessibility of the designed artwork to users (i.e., customers of a product collaboration platform).

6.2. Parametric Requests

In some embodiments, a customer requests assistance from a designer to create an interactive design of a custom product. Some designers may be only available at certain times; some designers may only support certain styles of designs or may be highly skilled at certain styles of designs. Furthermore, some designers support and assist only certain products in which they specialize and excel.

Suppose that a customer has a set of photographs that s/he took during a holiday as s/he celebrated the holiday with the family. Suppose that the set of photographs includes fifteen photographs, but the customer is not satisfied with any of the photographs because none of them favorably depicts all guests: some guests "look good" in some group shots, but other guests "look good" in some other shots. But none of the photographs includes the best shot of each guest in each of the group. Furthermore, the customer would like to have the holiday card ready within a week.

To solve that problem, the customer may have several options. One of the options is to request assistance from a designer who is skilled in creating a collage photograph from different photographs and who could pick the best shots from different photographs and combine the best shots in one collage photograph. Such a designer would have to be skilled in knowing how to select, crop, and combine the individual shots so that they have similar sizes, lighting, and exposure, and so that, when combined into one resulting photograph, the photograph looks naturally and realistically. The designer should be able to combine the different photographs into one coherent photograph that realistically depicts the best shots of several individuals portrayed in the group.

However, it would be unrealistic for the customer to know which designer possesses such specialized skills, is available at the given moment, and has experience in designing and customizing photographs.

To help with providing a specific request for assistance from a designer, a collaboration computer system may generate and display on a display device of the customer a GUI that could allow the customer to select certain parameters and characteristics of the designer that the customer is looking for. The GUI may be organized in many different ways, including selectable options, selectable submenus, selectable parameters, and the like.

Referring again to FIG. 5A, the customer may include one or more parameters in a request for assistance from a designer. In the depicted example, a request 550A includes a parameter1, a parameter2, a parameter3, and so forth. The number of parameters is usually specific to the request and depends on the specificity of the request and the requirements set forth by the customer.

Referring to the example above, in request 550A, the customer may specify, for example, that a requested designer should specialize in collage photography (parameter1), should specialize in illustrating (parameter2), and should be available within the next seven days (parameter3). Of course, the parameters may be provided in many different ways depending on the implementation. For example, a user may select the options that correspond to above listed parameters 1-3 and that are provided by a GUI displayed on a user device of the customer.

6.3. Selection of a Particular Designer

There are many ways of selecting a particular designer from a group of designers associated with a collaboration computer system and designating that designer to aid a customer who requested assistance. For example, upon receiving a request for assistance from a designer, a collaboration computer system may select an available designer by randomly selecting a first available designer from a group of designers.

Another way of selecting a particular designer is to use a Round-Robin-like algorithm that would select the designers sequentially, and thus give each designer a change to be selected and receive a work assignment.

Other approaches include assigning an available designer based on a best match between the specific information stated in a request and the information included in profiles of the designers. An example of a match-based selection of a particular designer to aid a customer uses parameters included in a request received from a customer and characteristics included in the profiles of the designers.

Some parameters may be included in a request automatically as a customer navigates via menus and submenus allowing the customer to request assistance. Other parameters may be explicitly entered by the customer as the customer requests the assistance. It is further assumed that profiles of the designers are created and available for the search before the requests for the assistance are received. One of many implementations of that approach is described below.

In some embodiments, upon receiving any of the requests 550A, 550B, 550C, a collaboration computer system parses the request to identify parameters included in the request.

In the example depicted in FIG. 5A, the parsing is performed by a designer selector 566, which may be a component of collaboration server 155 of a collaboration system 100.

In some embodiments, designer selector 566 comprises a parser 566A, a filter 566B, a searcher 566C, a machine learning model 566D, and an artificial intelligence module 566E. Additional elements may also be included in designer selector 566. In other implementations, a designer selector may include fewer components. The provided example should not be viewed as limited in any way.

In some embodiments, artificial intelligence module 566E may use machine learning model 566D to determine, for example, one or more designers, from a plurality of available designers, whose profiles meet the requirements set forth in a request received from a customer for aiding in creating an interactive design. For example, artificial intelligence module 566E may implement a neural network (explained later) to perform a search of the body of the designers' profiles using search keys obtained from parameters included in the request and determine a probability with which each of the corresponding profiles matches the search keys. An example is described in FIG. 5B.

In some embodiments, artificial intelligence module 566E may use machine learning model 566D to determine scores and ratings of the designers. For example, artificial intelligence module 566E may use input provided by various sources (e.g., customers, designers, agents, system administrator, etc.), apply machine learning model 566D designed to determine a score for a designer, and determine resulting scores for the designers.

In some embodiments, request 550A includes one or more action parameters. An action parameter is a parameter indicating an action in which a customer requires assistance. Examples of the action parameters are described in FIG. 5B.

Figure 5B:
FIG. 5B is a block diagram showing examples of action parameters implemented in a product collaboration platform.

FIG. 5B is a block diagram showing examples of action parameters implemented in a product collaboration platform. In the depicted example, request 550A includes one or more parameters (including parameter1, parameter2, and parameter3) and one or more actions. Non-limiting examples of actions are described in an element 552, and include the following: create, modify, suggest, change style, add an image, remove some details, add some details, find an image, generate a collage of elements, request another designer, set/change/cancel an appointment with a particular designer, rate the designer, and the like. The action examples depend on the implementation, and the above examples should not be viewed as limited in any way.

Referring again to FIG. 5A, upon receiving request 550A, a parser 566A may parse the request to identify one or more parameters and one or more actions in the request.

In some embodiments, one the one or more parameters and one or more actions are identified in the request, filter 566B may filter the parameters and actions to determine one or more search keys for searching a database that stores profiles of the designers.

Once the one or more search keys are determined based on the parameters and actions identified in the request received from the customer, searcher 566C may use the search key to search the database that stores profiles of the designers to select one or more designers whose profiles match the search keys.

In some embodiments, searcher 566C may utilize machine learning model 566D and artificial intelligence module 566E to perform the search of the profiles of the designers to identify one or more designers whose profiles match the search keys. Modules 556D and 566E may implement any type of neural networks. The different types of neural networks in deep learning, may include convolutional neural networks (CNN), recurrent neural networks (RNN), and artificial neural networks (ANN). Those networks may be considered the core of the deep learning approach for generating customized designs in collaboration with live designers and agents. The present approach may utilize any type of neural network and any type of machine learning model.

Once the modules 566C-566E determine one or more designers whose profiles meet the search criteria specified by the search keys, designer selector 566 may generate one or more recommendations 570A-B to recommend the one or more designers to the customer. A recommendation may include a name of the designer, contact information of the designer, a summary of the designer's profile, the designer's availability, and the like.

Upon receiving one or more recommendations 570A-B, the customer may select a particular designer and start communicating with that designer.

Initiating communications with a particular designer may be accomplished using many approaches. Examples of the approaches include establishing one or more communications channels between the customer and the particular designer. Examples of communications channels are described in FIG. 6.

7.0. Example Channels of Communication

Once a particular designer is selected from a set of available designers and designated to aid a customer in creating an interactive digital design, the particular designer and the customer may communicate with each other using one or more communications channels established between the designer and the customer across a collaboration computer system. Examples of the channels include a video session The video, text, and voice sessions may be embedded in the collaboration web or mobile interface, or an external application may be used (such as a Zoom meeting, a WebEx meeting, and the like), a phone meeting, a text-chat, annotations, and the like. In some embodiments, one or more simultaneous communications channels may be established between the particular designer and the customer. Examples of various channels of communication are described in FIG. 6.

Figure 6:
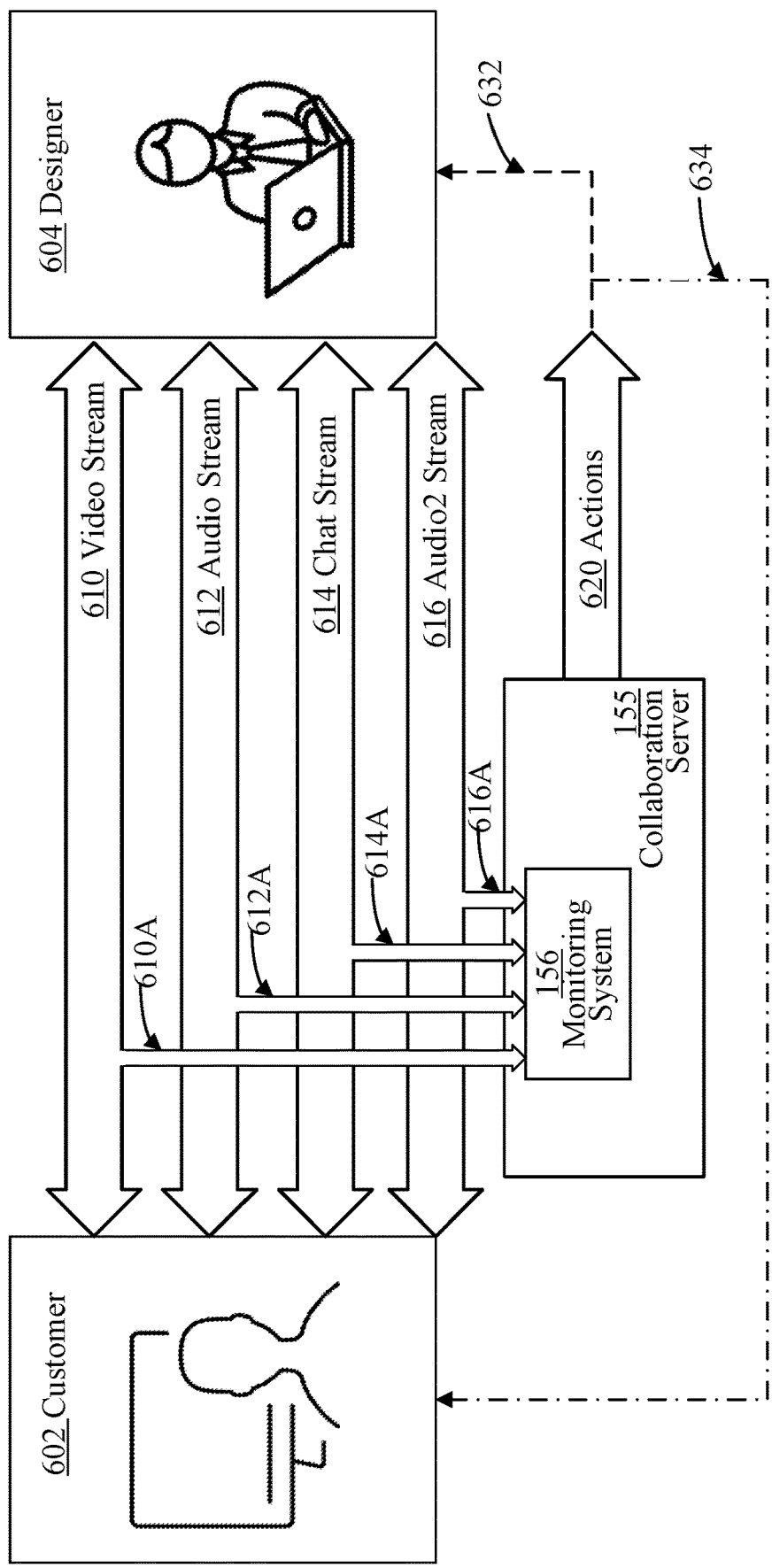
FIG. 6 is a block diagram showing examples of communications channels established between customers and designers.

FIG. 6 is a block diagram showing examples of communications channels established between customers and designers. Suppose that a customer 602 and a designer 604 collaborate with each other on an interactive design using a collaboration platform.

Suppose that customer 602 initiated, from his user device, a communications session with a user device of designer 604. Examples of the communications sessions may include a live video-based session, a live-audio session, and a live chat with a designer and/or support engineer.

If the devices of users 602, 604 established a video session, then the corresponding communications channel communicates a video stream 610 between users 602, 604. If the devices are connected using an audio session, then the corresponding communications channel communicates an audio stream 612 between users 602, 604. If the devices are connected using a chat session, then the corresponding communications channel communicates a chat stream 614. If the devices are connected using a phone line, then the corresponding communications channel communicates an audio2 stream 616. In some embodiments, the devices of users 602, 604 may establish two or more concurrent sessions.

In some embodiments, each of the data streams communicating between the users 602, 604 may be intercepted by monitoring system 156 or any other component, or device, configured to intercept the data streams. Referring to the example depicted in FIG. 6, the intercepted data includes one or more of: an intercepted video stream 610A, an intercepted audio stream 612A, an intercepted chat stream 614A, or an intercepted audio stream 616A. In some embodiments, additional streams may be intercepted.

In some embodiments, the intercepted data are processed by monitoring system 156 and/or collaboration server 155. The processing may include generating transcripts of the intercepted data streams and processing the transcripts to determine various characteristics of the interactions between users 602, 604. For example, based on the intercepted data streams, monitoring system 156 may determine whether the transcripts include characteristics that trigger violations of the term of use of the collaboration platform. The violations may include non-responsiveness, inappropriate language, non-addressing the questions, violations of ownership-license agreements, and the like.

If it is determined that the characteristics included in the transcripts trigger violations of the constraints included in, for example, an ownership-licensing tree capturing the terms of use of the collaboration platform, then collaboration server 155, or a component cooperating with collaboration server 155, determines one or more actions 620. The actions may include, for example, generating messages or notifications which may be sent (element 634) to user 602 and/or sent (element 632) to user 604. Alternatively, or in addition to, the messages may be sent to a manager of the collaboration platform and/or a manager who oversees the designers working using the collaboration platform.

8. Example Process of Collaborating with a Live Designer

8.1. Selecting a Particular Designer

Figure 7A:
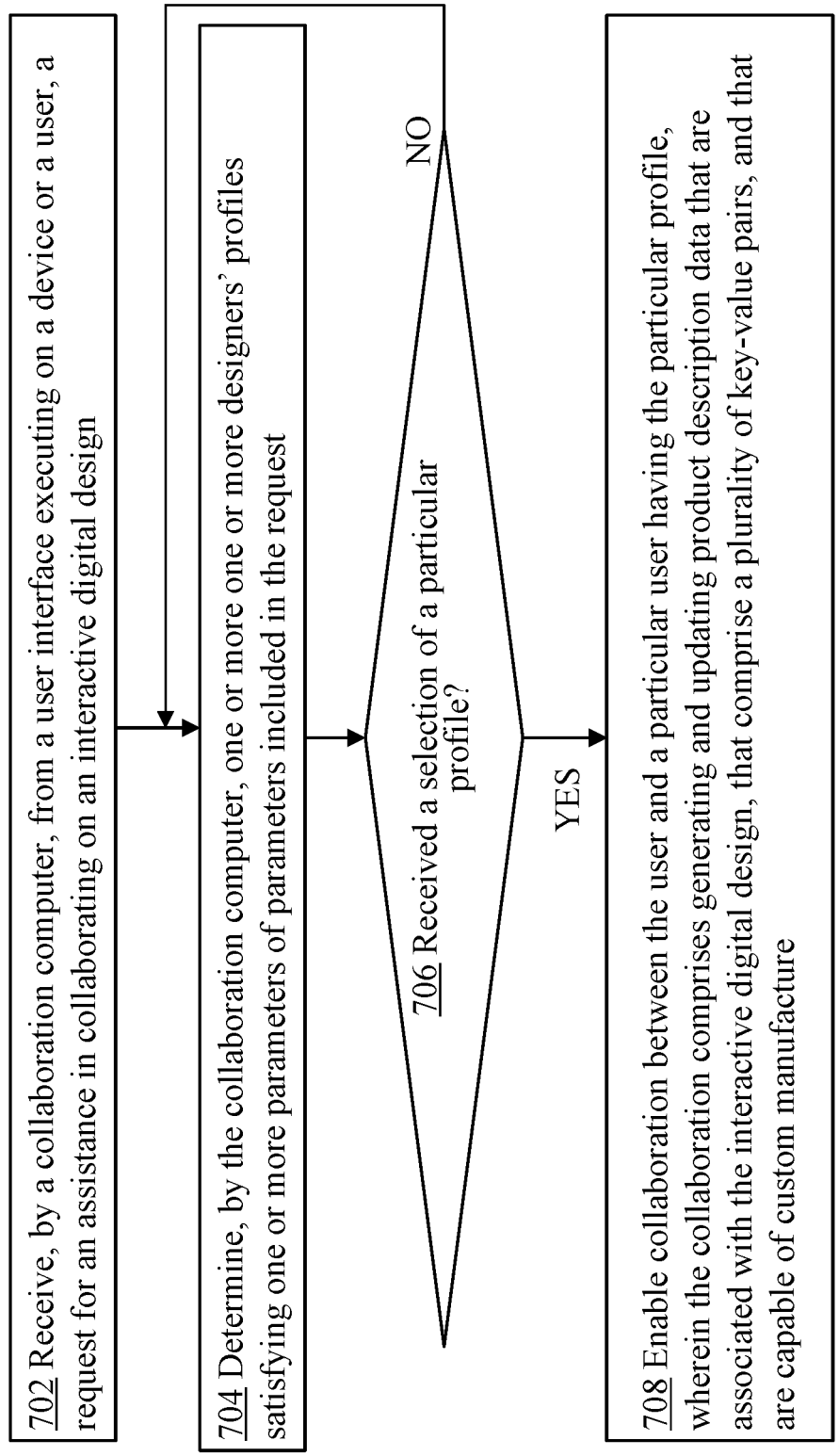
FIG. 7A is a flow chart showing an example process of generating customized products in collaboration with live designers and agents of a product collaboration platform.

Upon receiving a request for assistance from a live designer, a collaboration system may select one or more designers who could provide the assistance to a customer. Different ways of selecting the designers include random approaches, heuristic approaches, artificial intelligence approaches, some of which have been described above. The approach described in FIG. 7A is based on matching the parameters included in the request received from the customer with the profiles of the designers. That approach may be implemented using AI-based models as well as using search-based functionalities.

FIG. 7A is a flow chart showing an example process of generating customized products in collaboration with live designers and agents of a product collaboration platform. The steps described in FIG. 7A may be performed by a computer collaboration system 100, shown in FIG. 2. The steps may be also performed by a computer server collaborating with computer collaboration system 100. Alternatively, the steps may be performed by a distributed computer system that is communicatively coupled to computer collaboration system 100. For the simplicity of the description, the steps described in FIG. 7A are performed by the computer collaboration computer.

In step 702, a computer collaboration computer receives an electronic digital request, from a user interface that executes on a user device associated with a customer, for assistance in collaborating on an interactive digital design. In some embodiments, the electronic digital request comprises one or more collaboration parameters and/or actions. Examples of the parameters and actions are described in FIG. 5A-B.

In step 704, in response to receiving the electronic digital request, the collaboration computer selects one or more designer profiles from a plurality of designers' profiles, each designer profile satisfying one or more of the one or more collaboration parameters.

In step 706, the collaboration computer determines whether a particular designer has been selected from the one or more selected profiles. The selection of the particular designer may be made either by the customer or by the collaboration system.

In some embodiments, a selection of a particular designer, from a plurality of designers, is provided by a customer after the customer selected, or otherwise indicated, that the customer wishes to work with the particular designer. For example, a customer may explicitly ask for a particular designer.

According to another example, a customer may select a particular designer from an available list. For example, the collaboration computer may generate a GUI that includes a list of all selected designers whose profiles match one or more search keys generated based on the parameters included in the request submitted by the customer. For example, if the customer requested a designer who specialized in art-deco designs, and the collaboration system found three designers who have that specialties, the collaboration computer may generate a GUI that could display information about the three designers and, next to each of the three designers, could display a selector allowing the customer to select one of the three designers. Once the customer makes a particular selection of the particular designer, the selection may be communicated to the collaboration computer to indicate the designer that the customer selected.

However, if the collaboration computer disallows a customer to select a particular designer, then the collaboration computer selects a particular designer by itself. In some embodiments, the collaboration platform implements a designer-selection algorithm to select a particular designer from a set of designers. Examples of different algorithms were described above. Most of them provide some dose of objectiveness to the designer's selection process by giving each designer a chance to work and collaborate with customers.

For example, the collaboration system may determine, based on, for example, a machine learning model implemented in designer selector 566, shown in FIG. 5A, scores for each of the matching designers and select a particular designer, from the matching designers, based on the highest score.

Another approach for selecting a particular designer by the collaboration system may be based on the designer's availability, the designer's ratings, or the designer's workload. Other approaches may include assigning a first available designer, and the like. The approach for selecting the particular designer should not be viewed as limited to the examples described above.

If, in step 706, a selection of a particular designer has been made, then the collaboration computer proceeds to step 708; otherwise, the collaboration computer proceeds to executing the step 704 again or modify the list of the available designers and repeat the step 704.

In step 708, in response to selecting a particular designer, having a particular profile from the one or more designer profiles, the collaboration computer enables a collaboration between the customer and the particular designer on the interactive digital design. The collaboration between the customer and the designer comprises generating and updating product description data that are associated with the interactive digital design, that comprise a plurality of key-value pairs, and that are capable of custom manufacture. The process of creating and updating the product description data are described later.

8.2. Handling Design Modifications Received from a Live Designer

Figure 7B:
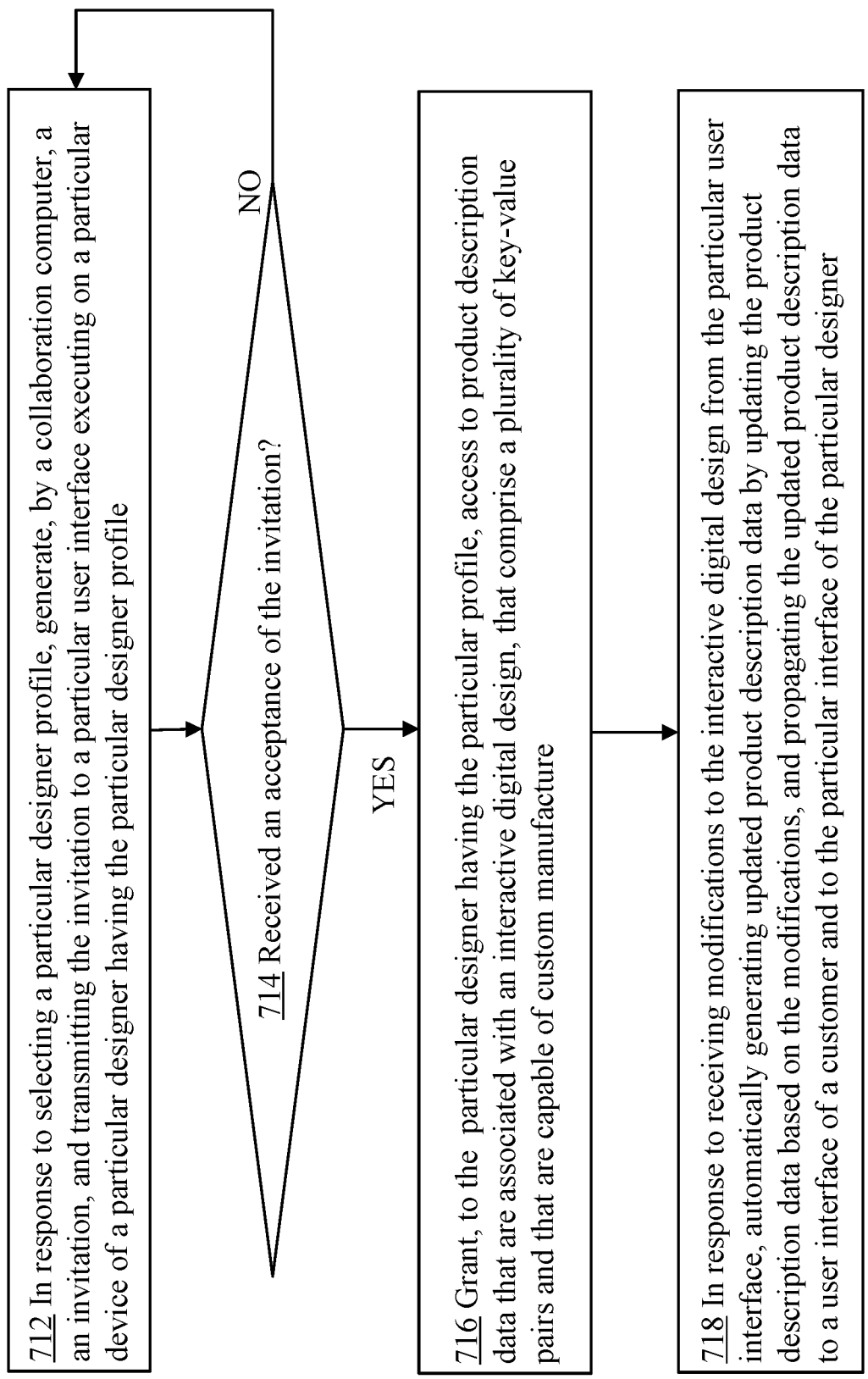
FIG. 7B is a flow chart showing an example process of collaborating with a live designer using a product collaboration platform.

FIG. 7B is a flow chart showing an example process of collaborating with a live designer using a product collaboration platform. The steps described in FIG. 7B may be performed by a computer collaboration system 100, shown in FIG. 2. The steps may be also performed by a computer server collaborating with computer collaboration system 100. Alternatively, the steps may be performed by a distributed computer system that is communicatively coupled to computer collaboration system 100. For the simplicity of the description, the steps described in FIG. 7B are performed by the computer collaboration system.

In step 712, in response to selecting the particular designer profile from the one or more designer profiles, a collaboration computer generates an electronic digital collaboration invitation and transmits the invitation to a particular user interface executing on a particular user device associated with a particular designer having the particular designer profile. This may include sending a text message or an email to the particular designer to inform the particular designer that his assistance is required by a customer.

In step 714, the collaboration computer awaits an acceptance to the invitation to collaborate from the particular designer. If the acceptance is received, then the collaboration computer performs step 716. Otherwise, the collaboration computer either generates another invitation and sends it to the same particular designer (as shown in FIG. 7B), or selects another designer, generates a new invitation to collaborate and sends the new invitation to another designer (not shown in FIG. 7B).

In step 716, in response to receiving an acceptance of the electronic digital collaboration invitation from the particular designer, the collaboration computer grants the particular designer access to product description data as an editor. The product description data includes data that are associated with an interactive design which the customer tries to create, and that comprise key-value pairs, described above.

Also in step 716, the collaboration computer transmits to the particular user device associated with the particular designer, the product description data for rendering the interactive digital design. At this point, the particular designer may access the interactive digital design, modify it, and otherwise update it to help the customer with the interactive design.

In step 718, in response to receiving modifications to the interactive digital design from the particular designer, the collaboration computer automatically generates updated product description data by updating the product description data based on the modifications received from the particular designer.

Furthermore, the collaboration computer propagates the updated product description data to the user interface of the customer and to the particular user interface of the particular designer to cause the interfaces to update their displays of the interactive digital design based on the updated product description data.

The process of modifying the product description data during a collaboration session between the customer and the designer may be repeated several times. In some embodiments, the collaboration server may handle editing of the same user interface modifying the same key-value pair within interaction time in several ways depending on agreement between the customer and the designer. In one method, the designer's modification is always selected. In another method, the customer's edit is shown to the designer to accept or reject. In another method, the designer's edit is shown to the customer to accept or reject. In yet another method, the customer's edit is applied, and then the designer's edit. In other embodiments there are methods to apply all edits in the order in which they reach the collaboration server.

8.3. Handling Design Modifications Received from a Customer

In some embodiments, both a customer and a designer may provide modifications to an interactive digital design of a customized product. The application of these changes may be applied by the collaboration server in the methods described above.

In the description below, it is assumed that the steps described in FIG. 7B have been already performed, and updated product description data have been generated by updating the product description data using the modifications received from the particular designer. It is possible, however, that the customer modifies the product description data before the particular designer does. Nevertheless, for the simplicity of the explanation, it is assumed that the particular designer has already provided his modifications to the product description data and that the modifications have been used to generate the updated product description data.

In some embodiments, in response to receiving an editing request from a customer interface generated on a customer device, to edit the interactive digital design, a collaboration computer grants the customer access to the updated product description data as an editor.

Furthermore, the collaboration computer transmits to the customer device associated with the customer, the updated product description data for rendering the interactive digital design in the user interface executing on the user device of the customer.

As the customer modifies the interactive design, new modifications are generated and the key-value pairs corresponding to the updated product description data are modified, edited, and then saved.

Upon receiving new modifications to the updated product description data from the user interface of the customer, the collaboration computer automatically generates a second updated product description data by updating the updated product description data based on the new modifications and propagates the second updated product description data to the user interface of the customer and to a particular user interface of the particular designer to cause the interfaces to update their displays of the interactive digital design based on the second updated product description data.

9. Rating and Scoring

In some embodiments, designers assisting customers in creating and customizing their interactive digital designs are rated and scored. For example, upon completing a collaboration session with a designer, a customer may be prompted to rate the designer, provide feedback about the designer, and/or provide preferences related to the designer. Alternatively, or in addition to that, an administrator of a collaboration computer system may monitor the interactions between the designer and the customer and rate the performance of the designer. For example, if the administrator notices, by monitoring messages generated by a monitoring system 156 described in FIG. 6 that the designer was non-responsive or failed to address the customer's questions, then the administrator may make a note about that in the profile of the designer. However, if the administrator notices, by monitoring messages generated by a monitoring system 156 described in FIG. 6 that the customer complimented the performance of the designer, then the administrator may make a note about that in the profile of the designer. Furthermore, the administrator may review the comments and/or emails received from the customer pertaining to the performance of the examiner and include those comments in the profile of the designer. Different types of rating categories are described below.

9.1. Based on Skills and Qualifications

In some embodiments, a designer may be rated based on the designer's skills and qualifications. This may include rating the designer in terms of their knowledge of the designing process, knowledge on the particular project, understanding the customer's requirements and expectations, and the like.

9.2. Based on Performance

In some embodiments, a designer may be rated based on the designer's performance. This may include rating the designer in terms of the quality of the created design, his attentiveness to the particular project, interactions with the customer, helping the customer with his project, and the like.

9.3. Based on Availability

In some embodiments, a designer may be rated based on the designer's availability. This may include rating the designer in terms of the designer's availability to start, perform and finish the project, his flexibility to assist in the particular project, his openness to comments and wishes from the customer, his results in helping the customer with the project, and the like. For example, the designers who are more available than other designers may be rated higher then the other designers.

9.4. Other Factors

In some embodiments, a designer may be rated based on other factors, such as familiarity of the functionalities and capabilities of a collaboration platform, the tools, and artistic designs. For example, a customer may rate a designer based on the designer's ability to use the tools and the GUI of the collaboration platform efficiently and effectively. Furthermore, the customer may rate the designer based on the designer's ability to explain the tools to the customer and provide efficient guidance in navigating the menus of the platform.

Furthermore, the designer may be rated based on how successful the designer's design is. For example, if a particular design has been shared with multiple users, and has been purchased by many users, then the designer who created that design may be rated rather highly since his design became popular and was in demand.

10. Role-Based Collaboration Platform

10.1. Role-Based Collaboration

Referring again to FIG. 2, computer collaboration system 100 is provided herein to illustrate clear examples and should not be considered as limiting in any way. Other computer collaboration systems may include additional components such as computer servers, various input/output devices, and additional software and/or hardware components that are not depicted in FIG. 2. Other computer collaboration systems may be implemented in cloud-based systems, distributed computer networks, and the like. Other computer collaboration systems may include fewer components than example computer collaboration system 100 shown in FIG. 2.

10.2. User Roles

Various roles may be assigned to users who interact with computer collaboration system 100 via user devices 140A-140G. Examples of roles may include a customer role, a customer support agent role, a graphics designer role, a customer peer role, and a customer product artist role. Based on the assigned roles, the users may be granted access to a product description of an interactive design as editors, viewers, managers, and the like.

A customer role may be assigned to a user who is a customer and who wants to customize one or more interactive designs offered by platform 100. A customer may, for example, edit/modify attributes of an interactive object, view a rendering of the customized design, publish the customized design, request that another user (a designer or a customer support agent) modify the interactive design according to the users' description, request a list of modifications that the user proposed for the interactive design, and/or delete or revert some of the modifications included in the list.

A customer support agent role may be assigned to a user who may assist other users in customizing an interactive design. A customer support agent may, for example, help in modifying the interactive design, provide various views of the rendered design, publish the rendered design on behalf of the user, and the like.

A graphics designer role may be assigned to a user who may assist in defining attributes for an interactive design, defining default values for the attributes for the design, defining ranges of the values for the attributes for the design, and/or customizing the interactive design. For example, a graphics designer may define a set of attribute-default values pair and store the pairs in product data definitions 104. A graphics designer may also define a set of roles that may be assigned to the users and store the set of roles in user profiles 102.

A customer peer role may be assigned to a user who may view an interactive design customized by someone else. A customer peer may, for example, view the interactive design and provide comments or feedback on the design to the customer. A customer peer may be granted access to a product description for the customized design, and in some embodiments, may modify the attributes associated with the design.

A customer product artist role may be assigned to a user who may provide tutorials and online help in customizing interactive designs. A customer product artist may define attributes for the designs, determine default values for the attributes, determine ranges of values for the attributes, determine the roles for the user who may be allowed to customize the interactive designs, and/or demonstrate how to use the customization functionalities.

Figure 8:
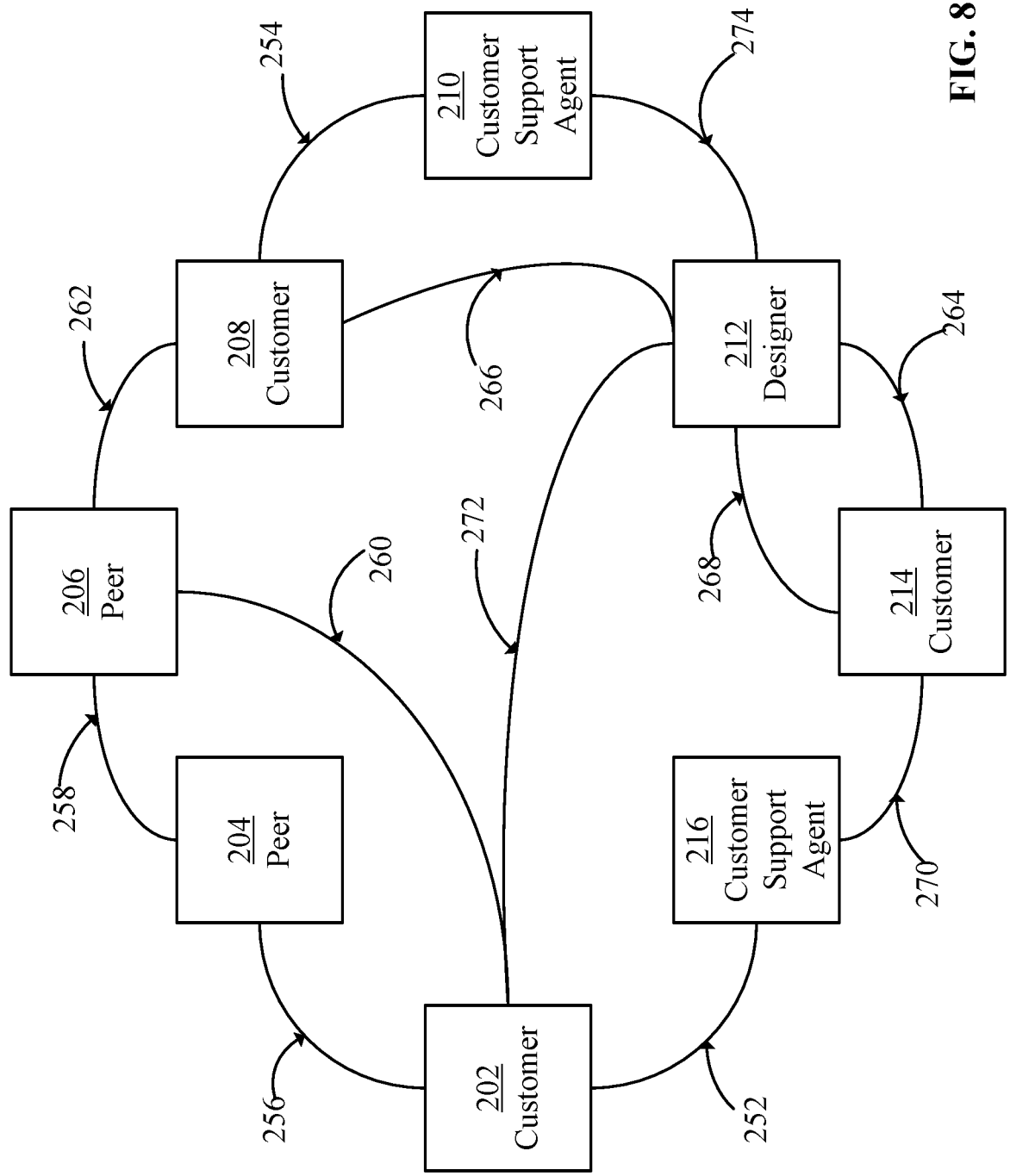
FIG. 8 is a block diagram showing examples of roles in a product collaboration platform.

FIG. 8 is a block diagram showing examples of roles in a product collaboration platform. In FIG. 8, examples of customer-agent collaboration sessions include a session 252 between a customer 202 and a customer support agent 216, a session 254 between a customer 208 and a customer support agent 210, a session 264 between a customer 214 and a designer 212, a session 266 between customer 208 and designer 212, a session 268 between a customer 214 and a designer 212, a session 270 between a customer 214 and customer support agent 216, and a session 272 between customer 202 and designer 212.

In some embodiment, a customer may use email, text, phone, and any other type of communications to describe to a customer support agent the design that the customer would like to achieve. Once the customer explains to the agent the desired design, the customer may select, from his user interface, a user interface element that would allow setting an editor role to the agent so that the agent could edit the interactive digital design for the customer. This would include granting the agent access to a product description associated with an interactive digital design as an editor.

In response to that, the agent may be provided with an updated user interface or a new user interface that would allow the agent to modify the interactive digital design. For example, the agent could select, from his user interface, a location-based attribute (or a group of attributes) and modify a value associated with the attribute, select another attribute and modify it, and so forth. Each modification may be automatically saved as a serialized key-value pair, and this solves the technical problem of navigating through countless sets of attributes and dealing with, for example, countless clicks to complete the customization as required in conventional customization platforms. The pairs may be transmitted to a product options framework, which would update the product description for the interactive digital design. Then, a product options framework may render a modified depiction of the interactive digital design and propagate the rendering to the user computers for rendering in the corresponding user interfaces.

10.3. User Profiles

Computer collaboration system 100 may include one or more storage devices for storing user profiles database 102. User profiles database 102 may be used to store information indicating roles assigned to individual users, access codes or keys assigned to the users, identifiers and passwords assigned to the users, and the like.

10.4. Designer Profiles

Depending on the implementation, designer profiles may be stored as user profiles in user profiles database 102. Alternatively, designer profiles are stored separate from user profiles; in that case, the designer profiles may be stored in designer database 562.

In some embodiments, designer profiles are stored in designer database 562. The type of information stored for each designer in designer database 562 depends on the implementation. According to one example, designer database 562 stores information about the designer's name, styles, genres, color palettes, media, samples, stock pictures, specialties, availability, ratings, scores, and the like. Examples of different types of information are described in FIG. 5A (element 500A).

10.5. Designer Designs

In some embodiments, computer collaboration system 100 stores, for a designer, the designer's designs, samples, stock pictures, and the like. That may be stored either in designer database 562 and/or designs database 564.

10.6. Product Definitions

Computer collaboration system 100 may further include one or more storage devices for storing product data definitions database 104. Product data definitions database 104 may include product descriptions of one or more interactive designs that are offered by computer collaboration system 100. A product description of an interactive design may include, for example, a global-key-values set, a set of attributes that are associated with the design, and default values that may be assigned to the attributes of the design.

10.7. Attribute Representations

Collaboration components 106 may include a component that is used to store a representation of attributes of an interactive design. The attributes may correspond to characteristics of the products and may be selected or provided by manufacturers of the products. The attributes may have assigned default values and the default values may be assigned either by the manufacturers, system administrators managing computer collaboration system 100 or platform 10, or artistic designers, as described earlier.

Descriptions of the attributes for each interactive design, or groups of designs, may be stored as part of collaboration components 106 or in a separate data structure that may be organized as a data table or storage space that is accessible to collaboration components 106. The descriptions of the attributes and values of the attributes associated with the products may be provided and/or requested by other components of computer collaboration system 100, such as a product options framework 120, which is described later.

For each interactive design available for customization using platform 100, default values of the attributes associated with the product may be modified by users according to the roles assigned to the users and according to the manufacturing constraints provided by a manufacturer. For example, if a customized product is a t-shirt, its default color may be red, but a user may modify the color by selecting any of three colors (e.g., red, green, or blue) to the tee-shirt. The modification may be stored in, for example, product data definitions 104.

An interactive design can be defined as the subset of the custom product attributes that may be altered, added, manufactured, or embellished for the purpose of custom product manufacturing. While the product attributes are product specific, they may include the substrate color or material choice for an area of the product, the trim material or color of a product, printed, engraved, or embroidered embellishments, and/or color palettes applied to the design.

Attribute definitions and types, as well as default values for the attributes of an interactive design, may be provided by a manufacturer or a designer of the design. The attributes and default values may be changed by the users according to, for example, the roles assigned to the users. For example, a user who is assigned a role of an artistic designer may be allowed to edit/modify the attributes associated with the design, edit the default values of the attributes, as well as edit the ranges of the values that may be assigned to the attributes.

Suppose that an interactive design is a mug. Then an artistic designer may define several attributes for the mug and define default values for the attributes. The attributes may include a color, a size, a label, and an ornamental design imprinted on the mug. The default values for the attributes may include red for the color, large for the size, hello for the label, and white stripes for the ornamental design. The artistic designer may also define that a customer may modify the color of the mug by selecting either red or blue and may modify the size of the mug by selecting either large or small.

In some embodiments, a product description may include, or be associated with, a journaled list of modifications that have been submitted by users for an interactive design. The list may also include other information such as identifiers of the users who provided the modifications, global-key-values generated as the collaborators collaborated on the customized product, a history log of the modifications that have been accepted, reverted or deleted, comments that have been provided by the user, and the like. For example, one or more modifications stored in the list may be undone or redone by using a couple of clicks, not by performing countless clicks to undo or redo the customization as in conventional customization platforms.

The journaled list including global-key-values is described in the next section.

10.8. Global-Key-Values

Computer collaboration system 100 may include one or more storage devices for storing global-key-values database 103. Global-key-values database 103 may store global-key-values sets that are used to track the contribution of each collaborator in a collaboration session, and to impartially establish copyrights and ownership for the customized product developed during the collaboration session.

All global-key-values pairs created and modified during a particular collaboration session are global in scope of that particular collaboration session. A global-key-value may correspond to a tuple, or a pair, that has a key and a value. While the key has a persistent meaning across all transactions, the value is scoped to a specific collaboration session. The key may indicate an attribute identifier/key, while the value may indicate a specific value for the key. For example, a global-key-value for an attribute called "owner" may include an "owner" as a key and a specific "user identifier" as a value. Detailed examples of global-key-values are described later.

For each customization project, at least one global-key-values set is generated. For example, when a customization project starts and a project owner initiates a collaboration customization session, collaboration system 100 may initiate global-key-values to indicate, for example, an identification of the owner, an identification of his license, and the like. Thus, the initial global-key-values set may include the following pairs: {Owner, user ID1}, {License, User ID1}. When the owner invites, for example, a designer to assist the owner with the customization, collaboration system 100 updates the set of global-key-values by adding an additional global-key-value pair to indicate, for example, an identification of the designer. Thus, the additional global-key-values pair may include: {Designer, user ID2}. When the owner decides to finish the collaboration customization session, collaboration system 100 may, for example, combine the relevant global-key-values pairs and initiate the processing of the pairs, as will be described later.

Examples of global-key-values may include constraints that specify rules and applicability of the rules to a product customization process, and transactions that specify entities and customization instructions for customizing the product. An example of a constraint global-key-value may include an age restriction constraint that prohibits individuals younger than 12 to customize the product. An example of a transaction global-key value may include a key-value pair that comprises customization instructions for a product customization.

In some embodiments, constraint global-key-values may be specified by an owner, a designer, and the like, during a product customization session, and may be used to specify one or more constraints to be applied to a product customization process. The examples of constraint global-key-values may include an age restriction constraint which may be represented as a key-value pair {Age, 12}. Age restriction constraint may, for example, indicate the minimum age of a customer who could purchase a custom product. Since certain products may be inappropriate for children, using a constraint global-key-value pair {Age, 12} may indicate that only customers who are at least 12 years old may purchase that product.

Another example of a constraint global-key-value is a content lock constraint, which may specify that a key-value or set of key-values may not be modified. Content lock may be a full lock, a partial lock, or a specific lock. For example, a user may specify that a first design is fully locked, while a second design is locked only if one attempts to modify a particular portion of the design (a partial lock or a specific lock).

Examples of constraint global-key-values may also include a blacklist content restriction constraint. This constraint may pertain to a list of content, such as imagery, text, color, or material composition. Blacklist constraint may include a blacklist key "Blacklist," and one or more names, words, and the like, to form: {Blacklist, name1, word1, . . . }.

Additional examples of constraint global-key-values may include a whitelist content restriction constraint. This constraint may pertain to a list of content, such as imagery, text, color, or material composition, that may be used to modify a key-value, or a set of key-values in the saved data of a product description, which is described later, or when a key value journal is applied to a custom product. Whitelist constraint may include a whitelist key "Whitelist," and one or more names, words, and the like, to form: {Whitelist, name1, word1, . . . } Additional details of constraint global-key-values are described later herein.

10.9. Collaboration Components

Referring again to FIG. 2, computer collaboration system 100 may include one or more software applications configured to implement collaboration components 106. Collaboration components 106 may include modules that are used to implement a role-based collaboration between users. The types of the modules included in collaboration components 106 may vary and may depend on the implementation of platform 100. In the example depicted in FIG. 1, collaboration components 106 include components configured to generate a plurality of representations. The examples of the representations are not shown in FIG. 2, but they are, however, described below.

10.9.1. User Interface Elements

Collaboration components 106 may include a component that is used to store a representation of user interface elements (not shown) that users may use to collaborate with each other and to customize interactive designs.

A user may modify values of attributes defined for an interactive design by using user interface elements presented and displayed for the user in a user interface. Examples of user interface may include a graphical user interface, a command-line interface, and the like. The user may use the user interface elements to customize/modify a style, color, size, label, ornamental design, surface qualities, material type, and the like of the interactive design. Furthermore, the user may customize individual portions of the customizable product or groups of portions of the customizable product.

The type and selection of user interface elements to be provided to a user may depend on a role assigned to the user. For example, if a user is a customer, then the user may edit his own interactive design, and thus he may be provided with a user interface that includes the interface elements that allow the user to edit and view the design, invite others to help the user in editing the design, invite others to view the design, and the like.

User interface elements may be specific not only to a role assigned to a user, but also to an interactive design itself. For example, if platform 10 offers customizable ties and customizable scarfs, and a user profile for a user includes information indicating that the user is a male, then it is assumed that the user might want to customize a tie, not a scarf. Furthermore, it may be assumed that the user would like to customize a color, a material, and a shape of the tie. Based on that information, collaboration components 106 may select the user interface elements that are specific to the tie and to the selection of the tie attributes.

10.9.2. User Interface Elements for Design Areas

Collaboration components 106 may include a component that is used to store a representation of graphical user interface elements (not shown) associated with design areas of a customizable product. Design areas may include one or more areas defined within the customized product that a user may customize and/or modify. For example, if platform 100 offers customizable mugs, then design areas may include an area for showing an outside surface of the mug, an area for showing an inside surface of the mug, and an area for showing a surface of the mug handle. A product description for the design may specify that a user may modify the appearance of each of the surfaces separately, or that the user may group the surfaces and modify the group.

10.10. Product Options Framework

In some embodiments, product options framework 120 comprises a plurality of modules and applications which, when executed by one or more processors 120, cause the processors to implement the method for role-based and attribution-tracking collaborative design of custom products. Product options framework 120 may be configured to communicate with an attribution framework 129, a rendering framework 130, an accessories framework 132, a bundling framework 134, and a defaulting framework 136.

Attribution framework 129 may be configured to, for example, generate an attribution tree based on global-key-values collected during a customization session. Attribution framework 129 may also be configured to use the attribution tree to determine and verify corresponding licenses and copyright privileges for users/collaborators who participated in the customization session. Furthermore, attribution framework 129 may be configured to track the contributions of the collaborators and to derive the manufacturing instructions from the global-key-values collected during the session.

Product options framework 120 may be configured to receive inputs from rendering framework 130 to generate a rendering of an interactive design based on, at least in part, a current representation stored in collaboration components 106. Product options framework 120 may be also configured to receive inputs from accessories framework 132 to determine one or more accessories for an interactive design, and to include the determined accessories in the customization of the product.

Furthermore, product options framework 120 may be configured to receive inputs from building framework 134 to determine constraints for customizing an interactive design. This may include determining one or more attributes that are associated with the design and that can be customized by users. This may also include assigning default values to the determined attributes, determining ranges of values for the attributes, and/or determining sets of values that may be assigned to the attributes.

Product options framework 120 may be also configured to receive inputs from defaulting framework 126 to determine a default design for an interactive design, determine default roles that may be assigned to the user, and determine initial values for various parameters and attributes associated with the designs and collaboration sessions.

10.11. Attribute Engines

Attribute engine 108 may be configured to facilitate role-based collaboration of customizable products according to roles assigned to users and according to manufacturing constraints set forth for the products.

Attribute engine 108 may be configured to, for example, interact with collaboration components 106, product options framework 120, frameworks 130-136 and user devices 140A-140D to allow the users using devices 140A-140G to collaborate in customizing interactive designs offered by platform 10.

In some embodiments, attribute engine 108 may be configured to interact directly with users of user devices 140A-140G. In other embodiments, attribute engine 108 may be configured to interact with users of user devices 140A-140G via a computer network 130, as shown in FIG. 2.

Computer network 130 may be implemented as any type of communications network, including a local area network (LAN), wide area network (WAN), a wireless network, a secure virtual LAN (vLAN), a secure virtual WAN (vWAN), and the like.

10.12. User Computers

User devices 140A-140G may include any type of communications devices configured to facilitate communications between users and computer collaboration system 100.

In the example depicted in FIG. 2, a user device 140A is a laptop, a user device 140B is a personal computer, a user device 140C is a personal assistant device, a user device 140D is a mobile device such as a smartphone, a user device 140E is a video camera, a user device 140F is a digital camera, and a user device 140G is a microphone configured to capture audio data and communicate the audio data to computer collaboration system 100.

The types and counts of user devices 140A-140G are not limited to the examples shown in FIG. 2. For example, even though FIG. 2 depicts only one laptop 140A, one personal computer 140B, one personal assistant 140C, one smartphone 140D, one video camera 140E, one digital camera 140F, and one microphone 140G, platform 10 may include a plurality of laptops 140A, a plurality of personal computers 140B, a plurality of personal assistants 140C, a plurality of smartphones 140D, a plurality of video cameras 140E, a plurality of digital cameras 140F, and a plurality of microphones 140G. In other examples, user devices may include fewer devices than those depicted in FIG. 2. In yet other examples, the user devices may include devices that are not depicted in FIG. 2.

10.13. Collaboration Server

Collaboration server 155 may be implemented in software, hardware, or both, and may be configured to cooperate with monitoring system 156 to provide monitoring capabilities to operators of the platform and/or a third-party monitoring service. The capabilities may include the ability to intercept contents of communications exchanged between the users of the collaboration platform, determine whether the communications meet the terms of the collaboration agreements, and pursue actions to address violations when the communications fail to meet the rules set forth in the agreements.

Collaboration server 155 may be part of computer collaboration system 100, as shown in FIG. 2. Alternatively, a collaboration server may be a system implemented in a computer server (not shown) that is separate from computer collaboration system 100.

In some embodiments, collaboration server 155 may comprise monitoring system 156, as shown in FIG. 2. In other embodiments, collaboration server 155 may be separate from monitoring system 156.

In some embodiments, collaboration server 155 is configured to transform ownership and license agreements, embedded in a plurality of key-value pairs journaled during a collaboration session between collaborators, into a graph-network and then into an ownership-agreement tree. The ownership-agreement tree may be used to represent the ownership and license agreements between the collaborators participating in the collaboration session.

Collaboration server 155 may be also configured to evaluate the ownership-agreement tree with respect to a plurality of role-based communications channels, established between the collaborators, for each constraint of a plurality of constraints on each collaborator of the collaborators.

The constraints may be identified from the ownership-agreement tree, and may include rules, guidance, conditions, specifications, and provisions that set forth the manner in which collaborators may communicate with each other during collaboration sessions. Examples of constraints may include agreement constraints (such as ownership agreements, license agreements, and the like), use constraints (that impose limits on editing and modifying design elements produced by collaborators), communications constraints (that impose limits to durations of the sessions, inactivity during the sessions, and the like), interactions constraints (such as contractual constraints and professional-conduct constraints), and content constraints (imposing blacklists and whitelists on the communications). Some of the constraints may be system-wide constraints and apply to one or more, or all, collaborations supported by a collaboration platform.

10.14. Monitoring System

In some embodiments, monitoring system 156 is implemented as a component of collaboration server 155, as shown in FIG. 2. In other embodiments, monitoring system 156 is implemented as a server (not shown) separate from collaboration server 155.

Monitoring system 156 may be configured to cooperate with collaboration server 155 in terms of tracking and monitoring the communications exchanged between collaborators, generating transcripts of the communications, and parsing the transcripts to determine characteristics of the corresponding data streams.

Monitoring system 156 may also be configured to assist collaboration server 155 in evaluating an ownership-agreement tree with respect to role-based communications channels, established between the collaborators, to determine whether any communications exchanged between the collaborators violate any constraints of a plurality of constraints.

10.15. Processors

In some embodiments, computer collaboration system 100 comprises agreement processor 152, communications processor 153, processor 120, and/or monitoring system 156. Among other things, components 152-153, 120 and 156 are configured to support collaboration server 155 in journaling key-value pairs that capture ownership and license agreements. They may also be configured to support transforming the key-value pairs into a graph-network and then into an ownership-agreement tree.

Components 152-153, 120 and 156 may also be configured to support collaboration server 155 in evaluating the ownership-agreement tree with respect to a plurality of role-based communications channels, established between the collaborators, for each constraints on each collaborator.

Moreover, components 152-153, 120 and 156 may support collaboration server 155 in determining whether one or more communications, monitored in the plurality of role-based communications channels, violate one or more constraints of the plurality of constraints.

That determination may include, among other things, generating transcripts of data intercepted from data communications channels supporting communications sessions established between collaborators. For example, components 152-153, 156 and 120 may generate a video transcript of the video chat and associate the transcript with the corresponding collaboration session. Components 152-153, 120 and 156 may provide the content of the transcript, including video frames, audio clips and chat texts, to monitoring system 156 and/or collaboration server 155.

Components 152-153, 120 and 156 may also be configured to collect statistical and diagnostic information about communications sessions established to support collaboration between users. For a communications session, the information may include information about the duration of the session, a count of retransmissions performed during the session, an indication of whether the session ended abruptly, and the like.

11. Journaled List and Collaboration

A user may collaborate with other users to modify a journaled list. For example, a user may select a set of user interface elements that are configured to transmit key-value pairs from the user interface to a product options framework as the user modifies an interactive design. Upon receiving the pairs, the product options framework may store the pairs in a journaled list and allow the user and his peers to perform editing or transformation operations on the list.

The types of editing or transformation operations that may be performed on the journaled list may include modifying values within a specific key-value pair stored in the list and modifying a single product attribute in a product description associated with the interactive design. The operations may also include removing a specific key-value pair from the list; removing all key-value pairs and associated data that do not directly contribute to a final form of the interactive design; re-ordering the key-value pairs and associated data, so that a final form of the interactive design is preserved, and edits that apply to a specific attribute group are performed in-sequence; and extending an editing operation and re-ordering operations, then grouping certain key-value pairs related to specific attribute groups, design areas, or location-based attributes, so that they may be edited as a single group. The operations may also include extending the editing operation listed above, so that key-value pair groups may be stored in memory for use later.

12. Manufacture of Customized Products

Suppose that a custom digital product is a customized greeting card. Furthermore, suppose that in the course of one or more collaboration sessions, collaborators developed an interactive, digital design of the customized greeting card. The processes described above may be employed to digital print the customized greeting card.

In some embodiments, various means are provided for handling manufacturing of custom products provided in a digital form. In this context, a digital product is a product that may be fully realized in software and digital media. Such products may have functionalities that are similar to functionalities of physical products. For example, it is possible to manufacture a physical custom greeting card using the methods described herein, and it is also possible to produce a digital greeting card by using very similar means. Instead of publishing a greeting card using a printing process, a digital greeting card may be manufactured by publishing it in a digital form which may be viewed by a specific digital service.

Constraints for generating digital and physical greeting cards may be similar. The constraints may be managed by a product options framework, described above. Furthermore, generating digital and physical greeting cards may have resolution constraints. That means that for an optimal quality of the visual presentation of the cards, each card generating process may have a constraint in the number of pixels-per-inch that is required.

Furthermore, generating digital and physical greeting cards may have size and ratio aspect constraints. Based on the paper size in the physical case, and on screen size in the digital case, there are constraints on the formatting and placement of design elements for the greeting card.

Moreover, both have color constraints. Each may have a target ICC color profile that imposes a specific gamut of colors for manufacturing the product. In the case of the physical product, it may be a CMYK profile such as U.S. Web Coated (SWOP) v2. In the case of the digital version, it may be sRGB IEC61966-2.1. Publishing each product requires rendering each design element to fit the constraints. Furthermore, both are published using manufacturing instructions that meet specific digital standards. Each must be expressed as a specific set of manufacturing instructions that meet the constraints. Finally, the customization and collaboration of each are usually the same.

In some embodiments, supporting digital products may include, but is not limited to, greeting cards, invitations, business insignias (such as logos, email and social media tags), birth announcements, personal identities, corporate communications, and virtual products, and as a token or representation of a physical product.

13. Implementation Mechanisms

Although the flow diagrams of the present application depict a particular set of steps in a particular order, other implementations may use fewer or more steps, in the same or different order, than those depicted in the figures.

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
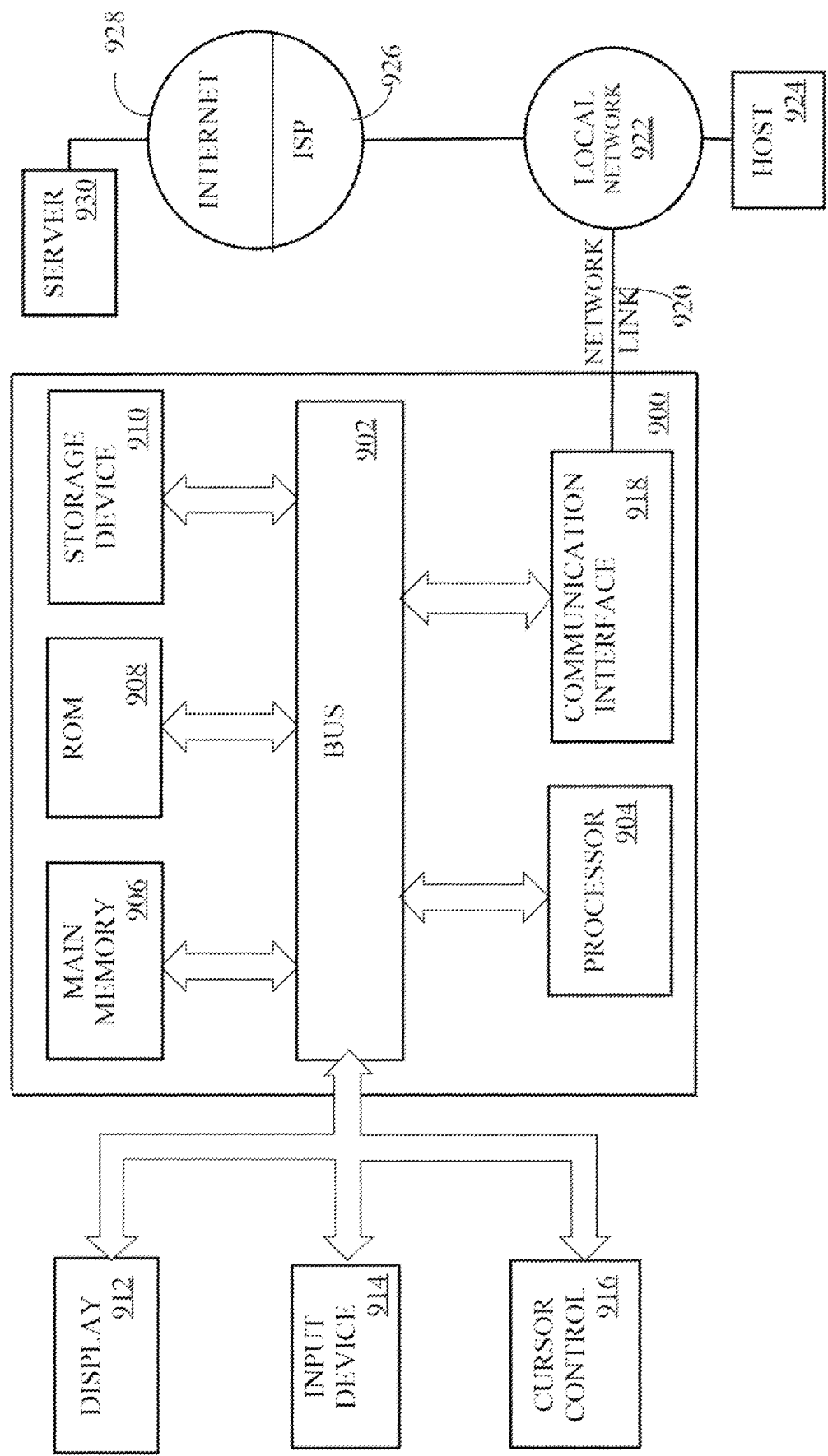
FIG. 9 is a block diagram of a computer system on which embodiments of the approach may be implemented.

FIG. 9 is a block diagram that depicts an example computer system 900 upon which embodiments may be implemented. Computer system 900 includes a bus 902 or other communication mechanism for communicating information, and a processor 904 coupled with bus 902 for processing information. Computer system 900 also includes a main memory 906, such as a random-access memory (RAM) or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. Although bus 902 is illustrated as a single bus, bus 902 may comprise one or more buses. For example, bus 902 may include without limitation a control bus by which processor 904 controls other devices within computer system 900, an address bus by which processor 904 specifies memory locations of instructions for execution, or any other type of bus for transferring data or signals between components of computer system 900.

An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input-device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic or computer software which, in combination with the computer system, causes or programs computer system 900 to be a special-purpose machine. According to one embodiment, those techniques are performed by computer system 900 in response to processor 904 executing one or more sequences of one or more instructions contained in main memory 906. Such instructions may be read into main memory 906 from another computer-readable medium, such as storage device 910. Execution of the sequences of instructions contained in main memory 906 causes processor 904 to perform the process steps described herein. In alternative embodiments, hard-wired circuitry may be used in place of or in combination with software instructions to implement the embodiments. Thus, embodiments are not limited to any specific combination of hardware circuitry and software.

The term "computer-readable medium" as used herein refers to any medium that participates in providing data that causes a computer to operate in a specific manner. In an embodiment implemented using computer system 900, various computer-readable media are involved, for example, in providing instructions to processor 904 for execution. Such a medium may take many forms, including but not limited to, non-volatile media and volatile media. Non-volatile media includes, for example, optical or magnetic disks, such as storage device 910. Volatile media includes dynamic memory, such as main memory 906. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip, or memory cartridge, or any other medium from which a computer can read.

Various forms of computer-readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated service digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic, or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world-wide packet data communication network now commonly referred to as the "Internet" 928. Local network 922 and Internet 928 both use electrical, electromagnetic, or optical signals that carry digital data streams.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918. The received code may be executed by processor 904 as it is received, and/or stored in storage device 910, or other non-volatile storage for later execution.

In the foregoing specification, embodiments have been described with reference to numerous specific details that may vary from implementation to implementation. Thus, the sole and exclusive indicator of what is, and is intended by the applicants to be, the approach is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
    receiving, at a computer collaboration computer, an electronic digital request, from a first user interface that executes on a first user device associated with a first user, for assistance in collaborating on an interactive digital design;
    wherein the electronic digital request comprises one or more collaboration parameters;
    in response to receiving the electronic digital request, automatically determining, by the computer collaboration computer, one or more designer profiles, each designer profile satisfying one or more of the one or more collaboration parameters;
    in response to selecting a particular designer profile from the one or more designer profiles:
        automatically enabling, by the computer collaboration computer, a collaboration on the interactive digital design between the first user and a second user who has the particular designer profile;
        wherein the collaboration between the first user and the second user comprises automatically generating and updating product description data that are associated with the interactive digital design;
        wherein the product description data comprise a plurality of key-value pairs for the interactive digital design;
        wherein a key-value pair of the plurality of key-value pairs for the interactive digital design includes a key, which is a property name of the interactive digital design, and a value, which is the value of an associated property name of the interactive digital design;
wherein the plurality of key-value pairs are translated into manufacturing instructions;
sending the manufacturing instructions to a manufacture to cause the manufacturer to custom manufacture, based on the manufacturing instructions, a physical product corresponding to the interactive digital design.

2. The computer-implemented method of claim 1, further comprising:
in response to selecting the particular designer profile from the one or more designer profiles:
automatically generating, by the computer collaboration computer, an electronic digital collaboration invitation and transmitting the electronic digital collaboration invitation to a second user interface executing on a second user device associated with the second user having the particular designer profile;
in response to receiving an acceptance of the electronic digital collaboration invitation:
granting second user access to the product description data as an editor;
transmitting, from the computer collaboration computer to the second user device associated with the second user, the product description data for rendering the interactive digital design in the second user interface executing on the second user device;
receiving a first modification to the interactive digital design from the second user interface;
automatically generating first updated product description data by updating the product description data based on the first modification and propagating the first updated product description data to the first user interface and to the second user interface to cause the first user interface and the second user interface to update their displays of the interactive digital design based on the first updated product description data.

3. The computer-implemented method of claim 2, further comprising:
in response to receiving an editing request from the first user interface to edit the interactive digital design:
granting first user access to the first product description data as an editor;
transmitting, from the computer collaboration computer to the first user device associated with the first user, the first updated product description data for rendering the interactive digital design in the user interface executing on the first user device;
receiving a second modification to the first updated product description data from the first user interface;
automatically generating second updated product description data by updating the first product description data based on the second modification and propagating the second updated product description data to the first user interface and to the second user interface to cause the first user interface and the second user interface to update their displays of the interactive digital design based on the second updated product description data.

4. The method of claim 3, wherein each of the first modification and the second modification is transmitted as a serialized key-value pair and associated data that capture details of a modification;
wherein each of the first modification and the second modification is transmitted to a product options framework that manages the interactive digital design and the product description data of a product description;
wherein each of the first modification and the second modification is stored in a journaled list associated with the product description;
wherein each of the first modification and the second modification is used to modify a single product attribute of the interactive digital design.

5. The method of claim 1, wherein granting access to the product description data is based on a role assigned a user, wherein the role is selected from one or more of: a customer role, a customer support agent role, a graphics designer role, a customer peer role, or a custom product artist role.

6. The method of claim 1, wherein a designer profile, of the one or more designer profiles, comprises one or more of: a designer name, one or more designing styles, one or more color palettes, one or more media, one or more design samples, one or more designer's specialties, one or more designer's availabilities, one or more designer's ratings, or one or more designer's scores.

7. The method of claim 1, wherein the electronic digital request for the assistance in collaborating on the interactive digital design is received from the first user interface in response to the first user selecting, from the first user interface, one or more of: an explicit request selector, an assistant search selector, a help selector, a helpful tool selector, an exploring option selector, a text chat channel selector, a video chat channel selector, an email selector.

8. One or more non-transitory computer readable storage media storing one or more instructions which, when executed by one or more processors, cause the one or more processors to perform:
receiving, at a computer collaboration computer, an electronic digital request, from a first user interface that executes on a first user device associated with a first user, for assistance in collaborating on an interactive digital design;
wherein the electronic digital request comprises one or more collaboration parameters;
in response to receiving the electronic digital request, automatically determining, by the computer collaboration computer, one or more designer profiles, each designer profile satisfying one or more of the one or more collaboration parameters;
in response to selecting a particular designer profile from the one or more designer profiles:
automatically enabling, by the computer collaboration computer, a collaboration on the interactive digital design between the first user and a second user who has the particular designer profile;
wherein the collaboration between the first user and the second user comprises automatically generating and updating product description data that are associated with the interactive digital design;
wherein the product description data comprise a plurality of key-value pairs for the interactive digital design;
wherein a key-value pair of the plurality of key-value pairs for the interactive digital design includes a key, which is a property name of the interactive digital design, and a value, which is the value of an associated property name of the interactive digital design;
wherein the plurality of key-value pairs are translated into manufacturing instructions;

sending the manufacturing instructions to a manufacture to cause the manufacturer to custom manufacture, based on the manufacturing instructions, a physical product corresponding to the interactive digital design.

9. The one or more non-transitory computer readable storage media of claim 8, storing additional instructions for:
in response to selecting the particular designer profile from the one or more designer profiles:
generating, by the computer collaboration computer, an electronic digital collaboration invitation and transmitting the electronic digital collaboration invitation to a second user interface executing on a second user device associated with the second user having the particular designer profile;
in response to receiving an acceptance of the electronic digital collaboration invitation:
granting second user access to the product description data as an editor;
transmitting, from the computer collaboration computer to the second user device associated with the second user, the product description data for rendering the interactive digital design in the second user interface executing on the second user device;
receiving a first modification to the interactive digital design from the second user interface;
automatically generating first updated product description data by updating the product description data based on the first modification and propagating the first updated product description data to the first user interface and to the second user interface to cause the first user interface and the second user interface to update their displays of the interactive digital design based on the first updated product description data.

10. The one or more non-transitory computer readable storage media of claim 9, storing additional instructions for:
in response to receiving an editing request from the first user interface to edit the interactive digital design:
granting first user access to the first product description data as an editor;
transmitting, from the computer collaboration computer to the first user device associated with the first user, the first updated product description data for rendering the interactive digital design in the first user interface executing on the first user device;
receiving a second modification to the first updated product description data from the first user interface;
automatically generating second updated product description data by updating the first product description data based on the second modification and propagating the second updated product description data to the first user interface and to the second user interface to cause the first user interface and the second user interface to update their displays of the interactive digital design based on the second updated product description data.

11. The one or more non-transitory computer readable storage media of claim 10, wherein each of the first modification and the second modification is transmitted as a serialized key-value pair and associated data that capture details of a modification;
wherein each of the first modification and the second modification is transmitted to a product options framework that manages the interactive digital design and the product description data of a product description;
wherein each of the first modification and the second modification is stored in a journaled list associated with the product description;
wherein each of the first modification and the second modification is used to modify a single product attribute of the interactive digital design.

12. The one or more non-transitory computer readable storage media of claim 8, wherein granting access to the product description data is based on a role assigned a user, wherein the role is selected from one or more of: a customer role, a customer support agent role, a graphics designer role, a customer peer role, or a custom product artist role.

13. The one or more non-transitory computer readable storage media of claim 8, wherein a designer profile, of the one or more designer profiles, comprises one or more of: a designer name, one or more designing styles, one or more color palettes, one or more media, one or more design samples, one or more designer's specialties, one or more designer's availabilities, one or more designer's ratings, or one or more designer's scores.

14. The one or more non-transitory computer readable storage media of claim 8, wherein the electronic digital request for the assistance in collaborating on the interactive digital design is received from the first user interface in response to the first user selecting, from the first user interface, one or more of: an explicit request selector, an assistant search selector, a help selector, a helpful tool selector, an exploring option selector, a text chat channel selector, a video chat channel selector, an email selector.

15. A computer collaboration computer comprising:
a memory unit;
one or more processors; and
a computer collaborator performing:
receiving, at a computer collaboration computer, an electronic digital request, from a first user interface that executes on a first user device associated with a first user, for assistance in collaborating on an interactive digital design;
wherein the electronic digital request comprises one or more collaboration parameters;
in response to receiving the electronic digital request, automatically determining, by the computer collaboration computer, one or more designer profiles, each designer profile satisfying one or more of the one or more collaboration parameters;
in response to selecting a particular designer profile from the one or more designer profiles:
automatically enabling, by the computer collaboration computer, a collaboration on the interactive digital design between the first user and a second user who has the particular designer profile;
wherein the collaboration between the first user and the second user comprises automatically generating and updating product description data that are associated with the interactive digital design;
wherein the product description data comprise a plurality of key-value pairs for the interactive digital design;
wherein a key-value pair of the plurality of key-value pairs for the interactive digital design includes a key, which is a property name of the interactive digital design, and a value, which is the value of an associated property name of the interactive digital design;
wherein the plurality of key-value pairs are translated into manufacturing instructions;

sending the manufacturing instructions to a manufacture to cause the manufacturer to custom manufacture, based on the manufacturing instructions, a physical product corresponding to the interactive digital design.

16. The computer collaboration computer of claim 15, wherein the computer collaborator further performs:
in response to selecting the particular designer profile from the one or more designer profiles:
generating, by the computer collaboration computer, an electronic digital collaboration invitation and transmitting the electronic digital collaboration invitation to a second user interface executing on a second user device associated with the second user having the particular designer profile;
in response to receiving an acceptance of the electronic digital collaboration invitation:
granting second user access to the product description data as an editor;
transmitting, from the computer collaboration computer to the second user device associated with the second user, the product description data for rendering the interactive digital design in the second user interface executing on the second user device;
receiving a first modification to the interactive digital design from the second user interface;
automatically generating first updated product description data by updating the product description data based on the first modification and propagating the first updated product description data to the first user interface and to the second user interface to cause the first user interface and the second user interface to update their displays of the interactive digital design based on the first updated product description data.

17. The computer collaboration computer of claim 16, wherein the computer collaborator further performs:
in response to receiving an editing request from the first user interface to edit the interactive digital design:
granting first user access to the product description data as an editor;
transmitting, from the computer collaboration computer to the first user device associated with the second user, the first updated product description data for rendering the interactive digital design in the first user interface executing on the first user device;
receiving a second modification to the first updated product description data from the first user interface;
automatically generating second updated product description data by updating the first product description data based on the second modification and propagating the second updated product description data to the first user interface and to the second user interface to cause the first user interface and the second user interface to update their displays of the interactive digital design based on the second updated product description data.

18. The computer collaboration computer of claim 15, wherein granting access to the product description data is based on a role assigned a user, wherein the role is selected from one or more of: a customer role, a customer support agent role, a graphics designer role, a customer peer role, or a custom product artist role.

19. The computer collaboration computer of claim 15, wherein a designer profile, of the one or more designer profiles, comprises one or more of: a designer name, one or more designing styles, one or more color palettes, one or more media, one or more design samples, one or more designer's specialties, one or more designer's availabilities, one or more designer's ratings, or one or more designer's scores.

20. The computer collaboration computer of claim 15, wherein the electronic digital request for the assistance in collaborating on the interactive digital design is received from the first user interface in response to the first user selecting, from the first user interface, one or more of: an explicit request selector, an assistant search selector, a help selector, a helpful tool selector, an exploring option selector, a text chat channel selector, a video chat channel selector, an email selector.

\* \* \* \* \*